(12) United States Patent
Shukuri et al.

(10) Patent No.: US 6,479,112 B1
(45) Date of Patent: Nov. 12, 2002

(54) GLASS PANEL AND METHOD OF MANUFACTURING THEREOF AND SPACERS USED FOR GLASS PANEL

(75) Inventors: Kyoichi Shukuri, Yokohama; Hideo Yoshizawa; Naoto Horiguchi, both of Sagamihara; Osamu Asano, Nagaokakyo; Keiichiro Okajima; Tomonori Miura, both of Abiko, all of (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 09/445,153

(22) PCT Filed: Apr. 30, 1999

(86) PCT No.: PCT/JP99/02361

§ 371 (c)(1),
(2), (4) Date: Feb. 25, 2000

(87) PCT Pub. No.: WO99/57406

PCT Pub. Date: Nov. 11, 1999

(30) Foreign Application Priority Data

May 7, 1998 (JP) ............................. 10-124440
Jun. 1, 1998 (JP) ............................. 10-151242
Aug. 5, 1998 (JP) ............................. 10-221345
Aug. 11, 1998 (JP) ............................. 10-226736

(51) Int. Cl.⁷ ..................... E06B 3/24; C03C 27/00
(52) U.S. Cl. ................. 428/34; 156/109; 52/786.13
(58) Field of Search ................ 428/34, 120; 52/786.13; 156/109, 107

(56) References Cited

U.S. PATENT DOCUMENTS

| | | | | |
|---|---|---|---|---|
| 4,132,218 A | * | 1/1979 | Bennett | ................ 52/397 |
| 4,683,154 A | | 7/1987 | Benson et al. | |
| 4,928,448 A | | 5/1990 | Phillip | |
| 5,657,607 A | * | 8/1997 | Collins et al. | .............. 428/34 |

FOREIGN PATENT DOCUMENTS

| | | | |
|---|---|---|---|
| DE | 41 01 277 | | 7/1992 |
| WO | WO 96/12862 | * | 5/1996 |

* cited by examiner

*Primary Examiner*—Donald J. Loney
(74) *Attorney, Agent, or Firm*—Fulbright & Jaworski L.L.P.

(57) ABSTRACT

A glass panel, its manufacturing method and a spacer for use in the glass panel. In the glass panel, a plurality of spacers (3) are formed between and along a first opposing face (2A) of a first glass sheet (1A) and a second opposing face (2B) of a second glass sheet (1B) so as to form a space (C) therebetween, and a sealing material (6) is provided at peripheral edge (1a) of the first glass sheet (1A) and the second glass sheet (1B) for maintaining the space (C) gas-tight. The plurality of such spacers (3) having, at one side thereof, contact portions (5) capable of coming into contact with the first opposing face (2A) are provided on the second opposing face (2B). The contact portions (5) and the first opposing face (2A) are movable relative to each other.

13 Claims, 22 Drawing Sheets

GLASS PANEL AND METHOD OF MANUFACTURING THEREOF AND SPACERS USED FOR GLASS PANEL

TECHNICAL FIELD

The present invention relates to a glass panel, and more particularly to a glass panel including a plurality of glass sheets, a plurality of spacers interposed between opposed faces of the glass sheets for forming a space therebetween, and a sealing material disposed along the peripheries of the opposed faces for maintaining the space under a gas-tight condition and binding the glass sheets together. The invention relates also to a method of manufacturing such glass panel as well as the spacer to be used therein for maintaining the opposed faces at a predetermined distance therebetween.

BACKGROUND ART

With the conventional glass panel of the above-noted type, for the purpose of improvement of heat insulating performance, it is extremely advantageous that the space be evacuated for restricting the heat transfer rate. However, as the inside of the space is evacuated, it becomes necessary for the two glass sheets to be able to endure the external pressure applied thereto.

Incidentally, if the inside of the space is evacuated to about 0.1 atm., the external pressure applied to the outer faces of the glass sheets due to the atmospheric pressure can reach as high as 10 tons/m$^2$ approximately. In order to endure such external pressure, spacers need to be disposed along the opposing faces of the glass sheets.

Conventionally, the above-described glass panel, as shown in FIG. 60 and FIG. 61, employs flat-plate like or column-like spacers 3, which are simply bound between the opposing face 2 of the first glass sheet 1A and the opposing face of the second glass sheet 1B. And, in the manufacture of this glass panel P, the respective spacers 3 are disposed with a predetermined distance therebetween on the opposing face 2 of the first glass sheet 1A and the opposing face 2 of the other second glass sheet 1B is disposed in contact with the spacer 3, and then a sealing material 6 made of low melting glass is sealed by melting on a peripheral edge 1a.

However, with the conventional glass panel described above, since the entire end faces of the spacer 3 are placed in contact with the opposing faces 2 of the glass sheets 1, heat conduction can occur through the spacer 3 in spite of the evacuation of the inside of the space C, leading to deterioration of heat insulating performance of the glass panel P. In order to reduce such heat conduction through the spacer 3, its heat conducting cross sectional area may be reduced. Yet, if the contact face of the spacer 3 for contacting the glass sheet 1 is minimized in order to reduce its heat conducting cross sectional area, such contact face may result in stress concentration to the glass sheet 1, so that hertzian crack due to external pressure is apt to occur.

Further, if the spacer 3 is formed thin in order to reduce its heat conducting cross sectional area, the spacer 3 may be broken by an external bending force when the glass panel P is warped due to a difference in the heat expansion rates of the two glass sheets 1 because of the temperature difference between the outside and the inside of the glass panel P.

Then, an object of the present invention is to provide a glass panel which can restrict heat conduction via the spacer 3 while effectively protecting the glass sheets 1 against development of crack in the glass sheets such as the hertzian crack and which can also prevent damage of the spacer 3 and also to provide a spacer for use in such glass panel.

DISCLOSURE OF THE INVENTION

According to a glass panel relating to claim 1, as shown in FIG. 1, a plurality of spacers 3 are disposed in a space C formed between and along e.g. a first opposing face 2A of a first glass sheet 1A and a second opposing face 2B of a second glass sheet 1B. The spacer 3 includes, in one side 3a thereof, a plurality of projections and recesses. The projections 4 of these projections and recesses are formed to have a predetermined height from the other side 3b, so that these form a contact portion 5 capable of coming into contact with the first opposing face 2A. And, this contact portion 5 is movable relative to the first opposing face 2A.

In this construction, the plurality of projections 4 are formed on the one side 3a of the spacer 3 so as to form the contact portion 5 for coming into contact with the glass sheet 1. Thus, the spacer 3 may come into contact with a greater area of the glass sheet 1. Hence, it becomes possible to prevent stress concentration at the portion of the glass sheet 1 contacting the contact portion 5, thus preventing development of crack such as the hertzian crack in the glass sheet 1.

Further, as the heights of the projections 4 for contacting the glass sheet 1 are set at a predetermined constant height from the other side 3b, all of the projections 4 come into contact with the glass sheet 1, thus assuring a large contact area to the glass sheet 1. On the other hand, as it is possible to prevent the entire surface of the one side 3a of the spacer from coming into contact with the glass sheet 1, the heat resistance may be increased.

Also, since the contact portion 5 of the spacer 3 is movable relative to the opposing face 2, even if there is developed a warp in the glass panel P, the resultant displacement between the spacer 3 and the glass sheet 1 along the direction of its surface may be offset by such relative movement, thereby to prevent development of associated shearing force within the glass sheet 1 or the spacer 3, so that damage of the glass sheet and the spacer 3 may be avoided.

A glass panel relating to claim 2 is characterized in that the projections are formed by means of cutting.

With this construction, in addition to the effect achieved by the glass panel of claim 1 described above, there is obtained a further effect of facilitation of the manufacture of the spacer 3.

That is to say, if the projections forming the contact portion 5 are formed by means of cutting, the cutting operation per se is simple and easy and the adjustment of the height of the projections from the other side too is easy. For instance, the side face to be cut will be formed in advance as a flat face adjusted to the predetermined height from the other side and then grooves will be formed by cutting, whereby the projections and recesses are formed. Accordingly, the projections may be formed to the predetermined height.

A glass panel relating to claim 3, as shown in FIG. 1, is characterized in that the other side 3b of the spacer 3 is fixedly formed on the second opposing face 2B.

With this construction, in addition to the effect achieved by the glass panel of claim 1 or 2, there are obtained further advantages that the assembly of the glass panel may be facilitated and that the spacer 3 will hardly be displaced inside the space C during use.

That is to say, with this construction, by fixedly forming the other side 3b of the spacer 3 on the second opposing face 2B, it is possible to effectively prevent tumbling or rolling of the spacer 3. Moreover, as the spacer 3 need not be maintained in position especially, as shown in FIG. 9 for instance, the second glass sheet 1B may be superposed with a desired posture over the first glass sheet 1A. Further, when the glass sheets 1 are flexed due to e.g. wind pressure so as to relax the distance between the two glass sheets 1A, 1B, there will occur no dislocation of the spacer 3 inside the space C.

A glass panel relating to claim 4, as shown in FIG. 1, is characterized in that the other side 3b of the spacer 3 is bonded to the second opposing face 2B.

With this construction, the effect of the construction of claim 3 described above may be obtained more reliably. That is to say, by bonding the other side 3b of the spacer 3 to the second glass sheet 1B, the fixation of the spacer 3 may be surer. For instance, as shown in FIG. 9 and FIG. 10, after the spacer 3 is fixed, the second glass sheet 1B will be superposed on the first glass sheet 1A with the spacer 3 being oriented downward. In this way, the second glass sheet 1B may be handled with any desired posture. As in FIG. 9, the second glass sheet 1B with its opposing face 2B oriented downward may be assembled with the first glass sheet 1A.

According to a glass panel relating to claim 5, the spacer 5 may be made of low melting glass.

With this construction, in addition to the effects achieved by the glass panels of claims 1 through 4, there is obtained another advantage that the manufacture and arrangement of the spacers 3 are facilitated.

Namely, for example, the low melting glass will be set on the second glass sheet 1B and then this is heated so as to form the spacer 3. For instance, frit of the low melting glass will be made into paste and then this is printed on the second opposing face 2B of the second glass sheet 1B and then baked, whereby a pre-spacer forming member 30 may be fixedly set on the second opposing face 2B. Then, by pressing this pre-spacer forming member 30 against the other glass sheet into a predetermined height at a temperature lower than the melting point, the spacer 3 may be formed with the predetermined height precisely.

In the course of formation of this pre-spacer forming member 30, even if the paste is heated and baked, by setting the melting point of the second glass sheet 1B higher than this temperature, the second glass sheet 1B will not be affected by the pressing or not be damaged by the heat.

According to a glass panel relating to claim 6, the spacer 3 may be made of crystalline glass.

With this construction, in addition to the effect achieved by the glass panel of claim 5, there is obtained a further advantage that the spacer 3 may be reinforced although it is baked at the low temperature.

That is to say, for instance, frit of low-melting crystalline glass will be prepared into paste and the pre-spacer forming member 30 will be shaped at a temperature higher than the melting temperature into predetermined dimensions and shape, and then cooled under predetermined cooling conditions, whereby the spacer 3 may be formed of the crystalline glass. As a result, the strength of the spacer 3 is increased and its melting point is raised. Hence, when the peripheral edge of the glass panel P is sealed with low melting glass for instance, the spacer 3 will not be softened. And, the peripheral edge may be sealed with low-melting glass of similar properties, so that the manufacturing process of the glass panel may be simplified.

According to a glass panel relating to claim 7, the sealing material 6 may be comprised of low-melting glass having a lower softening point than the low melting glass forming the spacer 3.

With this construction, in addition to the effect achieved by the glass panel of claim 5 or 6, there is obtained a further advantage that the spacer 3 may be protected in the course of assembly of the glass panel P.

That is to say, when the peripheral edge 1a of the glass panel P is sealed with the sealing material 6 comprised of the low melting glass, even if the sealing material 6 is heated above the softening temperature, it is possible to prevent softening of the spacer 3 disposed in advance. As a result, it is possible to prevent such inconvenience as deformation of the spacer 3.

According to a glass panel relating to claim 8, as shown in FIG. 22, in a glass panel in which a pair of glass sheets 1A, 1B are disposed with a predetermined distance therebetween to form a space C and an outer peripheral sealing portion is provided along the entire peripheral edges of the two glass sheets 1A, 1B so as to seal the space C under evacuated condition, a spacer 3 is interposed between a first opposing face 2A of the first glass sheet 1A and a second opposing face 1B of the second glass sheet 1B for maintaining the opposing faces 2A, 2B with a predetermined distance therebetween. This spacer 3 includes a pair of contact portions 5 for coming into contact with the two opposing faces 2A, 2B respectively and a heat-transfer resisting portion formed between the pair of contact portions 5, 5, the heat-transfer resisting portion having a smaller cross sectional area than a contacting area between each contact portion 5 and the glass sheet 1.

With this construction, the heat-transfer resisting portion 20 is formed between the pair of contact portions 5, 5.

More particularly, with reference to an example shown in FIG. 22, there are provided a contact portion 5 provided by a flat plate portion 21 for coming into contact with the opposing face 2A of the first glass sheet 1A and the other contact portion 5, and this other contact portion 5 is provided by forming, into a flat surface, a bottom 22a of a base portion 22 for coming into contact with the opposing face 2B of the second glass sheet 1B. And, the base portion 22 includes, upwardly of the bottom 22a, an outer face 22b which is formed as a revolving surface. And, between the top of the base portion 22 and the back of the contact portion 5 are connected together to form a border portion 23. This border portion 23 has a reduced cross sectional area forming a constricted passage for heat transfer; hence, this border portion 23 provides the heat-transfer resisting portion 20.

Further, with this construction, the contact portions 5 for coming into contact with the two glass sheets 1A, 1B may be maintained at a contact area sufficient for preventing damage of the glass and damage of the glass sheets may be prevented. That is, in this construction, between the two contact portions 5, 5, there is formed the heat-transfer resisting portion 20 having a smaller cross sectional area than the contact area between the contact portion 5 and the glass sheet 1. In this regard, generally, heat-transfer resistance is in inverse portion to the cross sectional area. Then, regardless of the magnitude of the contact area between the contact portion 5 and the opposing faces 2A, 2B, the heat conduction between the opposing faces 2A, 2B via the spacer 3 may be small. As described above, according to the glass panel having this construction, hertzian crack may be prevented and also the external pressure applied to the glass sheets 1 through contact with the spacer 3 may be reduced, whereby damage of the glass plates 1 may be prevented.

According to a glass panel relating to claim 9, as shown in FIG. 23, opposed contact portions 5, 5 of the spacer 3 are provided in the form of plate-like portions 24 and between these plate-like portions 24, 24, there is formed a column-like portion 25 having a smaller cross sectional area than the contact area between the plate-like portion 24 and the glass sheet 1, so that this column-like portion 25 provides a heat-transfer resisting portion 20.

With this construction, the contact portions 5 are provided in the form of the plate-like portions 24 which come into face contact with the respective opposing faces 2A, 2B of the two glass sheets 1A, 1B, so that stress concentration to the two glass sheets 1A, 1B may be relieved. Moreover, between the plate-like portions 24, 24 which come into contact with the opposing faces 2A, 2B, there is formed the column-like portion 25 having a smaller cross sectional area than their contact area, so that heat conduction via the spacer 3 may be restricted by the column-like portion 25.

In this manner, if the spacer 3 having the above construction is employed, the heat-transfer resistance of the spacer 3 may be enhanced, while the contact area between the spacer 3 and the opposing face 2A, 2B may be maintained at a required magnitude.

According to a glass panel relating to claim 10, a truncated conical base portion 22 integrally forms a plate-like portion 21 having a greater area than the top surface of the base portion 22, and a border portion 23 between the base portion 22 and the plate-like portion 21 is provided as the heat-transfer resisting portion 20, and the contact portions 5 are provided in the plate-like portion 21 and a bottom 22a of the base portion 22.

That is to say, as shown in FIG. 24, the plate-like portion 21 having a greater area than the top face of the base portion 22 is formed integrally on the truncated conical base portion 22, and the border portion 23 between the base portion 22 and the plate-like portion 21 is formed as the heat-transfer resisting portion 20.

With this construction, the contact portion 5 for contacting the opposing face 2A of the first glass sheet 1A is provided by the plate-like portion 21 and the contact portion 5 for contacting the opposing face 2B of the second glass sheet 1B is provided by the bottom 22a of the truncated conical base portion 22 formed integral with the plate-like portion 21. So that, the large contact areas for contacting the two opposed faces 2A, 2B are maintained, and at the same time the heat-transfer resisting portion 20 is provided by the reduced-diameter top of the base portion 22, i.e. the border portion 23 between base portion 22 and the plate-like portion 21, whereby the heat transfer resistance may be enhanced as well.

According to a glass panel relating to claim 11, as shown in FIG. 25 and FIG. 26, a peripheral wall 26 of a column-like member 25 as the spacer 3 is recessed along its entire periphery so as to form a recessed face portion 27 having a reduced cross section, so that this recessed face portion 27 functions as the heat-transfer resisting portion 20.

If the recessed face portion 27 is defined in the peripheral wall 26 of the spacer 3 like the present construction, the small cross section portion is formed in the middle of the column-like member 25 and the opposed ends thereof provide the contact portions 5. Then, in the middle portion, there is formed the portion having a smaller cross section than the contacting areas, and this portion constitutes the heat-transfer resisting portion 20. Then, the contact area between the opposed glass sheets 1A, 1B and their opposing faces 2A, 2B may be maintained large so as to prevent damage of the glass sheets and at the same time the heat-transfer resisting portion 20 having a smaller cross section is provided for improving the heat insulating performance of the glass panel.

According to a glass panel relating to claim 12, the spacer includes a first contact portion 5a for contacting the first glass sheet 1A, a second contact portion 5b for contacting the second glass sheet 1B, and a through hole 30 in the form of a hole or the like extending from the first contact portion 5a to the second contact portion 5b.

With the conventional glass panel P, when its transparency as a window pane is considered, as the spacers are densely disposed, the individual spacers tend to show conspicuously when viewed through the glass panel P. And, this tendency is more pronounced when the viewer is located close to the glass panel P.

If the through portion 30 extending from the first contact portion 5a to the second contact portion 5b is formed like the present construction, the spacer 3 blocks a smaller area of the glass surfaces when the glass panel P is seen through, so that the transparency of the glass panel P may be improved.

According to a glass panel relating to claim 13, the spacer is constructed such that the first contact portion 5a and the first glass sheet 1A and also the second contact portion 5b and the second glass sheet 1B respectively come into point or line contact with each other.

If the contact area of the spacer 3 relative to the first glass sheet 1A and also to the second glass sheet 1B is reduced, the heat conduction between the first glass sheet 1A and the second glass sheet 1B may be minimized, so that a glass panel P having superior heat insulating performance may be obtained. Incidentally, with this construction too, the transparency of the spacer 3 achieved in claim 12 may be maintained well.

According to a glass panel relating to claim 8, as shown in FIG. 43 and FIG. 44, a plurality of spacers 3 are interposed between a first opposing face 2A of a first glass sheet 1A and a second opposing face 2B of a second glass sheet 1B so as to form a space C between the first opposing face 2A and the second opposing face 2B, and a sealing material 6 is disposed at peripheral edges of the first and second opposing faces 2A, 2B, the sealing material being capable of maintaining the space C air-tight at the peripheral edges 1a of the glass sheets 1A, 1B and also of bonding the glass sheets 1A, 1B together.

Then, one side of each of the plurality of spacers 3 is bonded to the second opposing face 2B and the other side of each spacer 3 has a smaller diameter than the one side and a predetermined constant height from the one side so as to provide a contact portion 5 capable of coming into contact with the first opposing face 2A, and said contact portion 5 is movable relative to the first opposing face 2A.

With this construction, the spacer 3 is bonded to the second glass sheet 1B. Hence, the spacer 3 does not move or tumble relative to the second glass sheet 1B. Hence, the superposing operation of the glass sheets 1 may be significantly facilitated.

Further, as the spacer has one end formed thick and the other end formed thin, the heat conduction between the contact portion 5 of this spacer 3 and the first glass sheet 1A may be restricted and also the spacer obtains resistance against bending deformation.

Moreover, as the contact portion 5 of the spacer 3 and the first glass sheet 1A are slidable relative to each other, there will occur no shearing warp in the glass sheets in association with flexion of the glass panel P, so that the risk of breakage of the glass sheets too may be eliminated.

As described above, according to the glass panel having this construction, the assembly of the glass panel P is easy.

Also, the strength of the spacer 3 per se may be retained while the heat conduction between the first glass sheet 1A and the second glass sheet 1B may be restricted maximally. And, at the same time, the breakage of the glass panel may be prevented.

According to a glass panel relating to claim 9, as shown in FIG. 37, the spacer 3 has a truncated conical shape. Specifically, the spacer 3 is provided in the form of a truncated cone having a base face bonded to the second opposing face 2B and a top face which forms a contact portion 5 capable of coming into contact with the first opposing face 2A.

With this construction, in addition to the effect achieved by the glass panel of claim 8 described above, even when a relative displacement occurs between the first opposing face 1A and the second opposing face 2B along these faces, the internal stress inside the spacer 3 due to an associated bending moment affecting the spacer 3 may be equated, hence, even if the top face of the truncated cone is formed small, breakage of the spacer 3 may be avoided.

According to a method of manufacturing a glass panel relating to claim 10, as illustrated in FIG. 36 and FIGS. 38–44, the method comprises the steps of: disposing a plurality of spacers 3 between a first opposing face 2A of a first glass sheet 1A and a second opposing face 2B of a second glass sheet 1B to form a space C between the first glass sheet 1A and the second glass sheet 1B and sealing and integrating peripheral edges 1a of the first glass sheet 1A and the second glass sheet 1B;

wherein the method comprises the steps of: preparing a paste 7 capable of forming each spacer 3; forming the paste 7 into a predetermined shape having a gradually reduced diameter toward its top and disposing it on the second opposing face 2B; subjecting each paste 7 to a predetermined solidifying operation to provide a plurality of pre-spacer forming members 30; adjusting a contact portion 5 capable of contacting the first glass sheet 1A of each of the plurality of pre-spacer forming members 30 after the solidifying operation thereof into a predetermined height relative to the second opposing face 2B so as to provide the spacers 3; and integrating the first glass sheet 1A and the second glass sheet 1B together with placing the first opposing face 2A in opposition to the height-adjusted contact portion 5.

With this method, as the paste 7 is disposed at a predetermined position on the second opposing face 2B and then solidified, the formed spacers 3 are disposed at the predetermined positions on the second glass sheet 1B and have one end thereof bonded to the second opposing face 2B. And, as the contact portion 5 for coming into contact with the first opposing face 2A ha a smaller diameter than the one side, the contact area relative to the first opposing face 2A may be small, so that the heat-transfer resistance between the first glass sheet 1A and the second glass sheet 1B may be increased. Further, as the one side is formed with a greater diameter than the contact portion 5, deformation in the course of height-adjusting shaping of the pre-spacer forming member 30 may be avoided, so that the spacer 3 may be shaped stably.

For instance, according to this manufacturing method, if the pre-spacer forming member 30 which was disposed at a predetermined position and then subjected to the solidifying operation for heating up to a predetermined baking temperature is shaped for its height adjustment by means of a shaping roll or the like before it is completely solidified in the subsequent cooling operation, a spacer 3 having a predetermined height may be easily obtained.

Further, as the one side is bonded to the second opposing face 2B, the posture of the second glass sheet 1B during the manufacture of the glass panel may be freely selected. Hence, when the two glass sheets 1A, 1B are superposed one on the other, the operations for maintaining the position of the spacer 3 and maintaining the posture of the second glass sheet 1B may be eliminated, whereby the operational efficiency may be improved.

Furthermore, since the contact portion 5 is slidable relative to the first opposing face 2A, as for possible deformation of the glass panel P, associated relative displacement between the first glass sheet 1A and the spacer 3 is permitted, thereby to avoid breakage of these.

According to a method of manufacturing a glass panel relating to claim 11, as shown in FIGS. 36 and 43, FIG. 44 and FIGS. 47 through 52, the method comprises the steps of: interposing a plurality of spacers 3 between a first opposing face 2A of a first glass sheet 1A and a second opposing face 2B of a second glass sheet 1B so as to form a space C between the first glass sheet 1A and the second glass sheet 1B; and sealing and integrating peripheral edges of the first glass sheet 1A and the second glass sheet 1B;

wherein the method comprises the steps of: preparing a paste 7 capable of forming the spacer 3; forming the paste 7 into a predetermined shape having a gradually reduced diameter toward its top and disposing it on the second opposing face 2B; subjecting each paste 7 to a predetermined semi-solidifying operation to provide a plurality of semi-solidified pre-spacer forming members 30; adjusting a contact portion 5 capable of contacting the first glass sheet 1A of each of the plurality of semi-solidified pre-spacer forming members 30 after the semi-solidifying operation thereof into a predetermined height relative to the second opposing face 2B; subjecting the height-adjusted pre-spacer forming members 30 to a predetermined solidifying operation so as to provide a plurality of spacers 3; and integrating the first glass sheet 1A and the second glass sheet 1B together with placing the first opposing face 2A in opposition to the height-adjusted contact portion 5.

With this manufacturing method, as the one side is formed with a greater diameter than the contact portion 5, shape deformation of the pre-spacer forming member 30 during its height-adjusting shaping operation may be avoided, so that the spacer 3 may be formed stably. As the smaller diameter of the contact portion 5 than the one side also serves to reduce the contact area relative to the first opposing face 2A, thereby to increase the heat-transfer resistance between the first glass sheet 1A and the second glass sheet 1B.

Further, as the one side of the spacer 3 is bonded to the second opposing face 2B, the posture of the second glass sheet 1B during the manufacture of the glass panel may be selected freely. So, when the second glass sheet 1B is superposed, the trouble of maintaining the posture of the spacer 3 may be eliminated, so that the operational efficiency may be significantly improved Moreover, as the contact portion 5 is slidable relative to the first opposing face 2A, even if surface deformation occurs in the glass panel P, the first glass sheet 1A and the spacer 3 may move relative to each other, so that no excessive stress is applied to the spacer 3 and breakage or the like of the spacer 3 may be avoided.

As described above, this manufacturing method provides facilitated assembly of the glass panel and high productivity and provides a glass panel P having improved heat insulating performance.

According to a manufacturing method of a glass panel P relating to claim 12 and 13, as shown in FIG. 37, the spacer 3 of claim 10 and 11 is shaped in the form of a truncated cone.

For instance, the truncated cone may comprise a bottom face thereof as the one side of the spacer 3 bonded to the second opposing face 2B of the second glass sheet 1B and a top face thereof as the contact portion 5 formed on the side of the first opposing face 2A.

With this method, in addition to the effects achieved by the manufacturing methods of claim 10 and 11 there are achieved following effects when the firs glass sheet 1A and the second glass sheet 1B are displaced relative to each other along the faces of the glass sheets. Namely, when the first glass sheet 1A and the second glass sheet 1B are displaced relative to each other, a bending moment will be applied to the spacer 3. However, as this bending moment is smaller on the side of the contact portion 5, then, although the construction is tapered on the side of the contact portion 5, the bending stress within the spacer 3 may be even, so that breakage of the spacer 3 may be effectively prevented even though the top face of the truncated cone is formed small.

BEST MODES OF EMBODYING THE INVENTION

Embodiments of a glass panel relating to the present invention will be described with reference to the drawings.

[First Embodiment]

In the following, the glass panel P relating to the present invention will be described with reference to the drawings.

Figure 11:
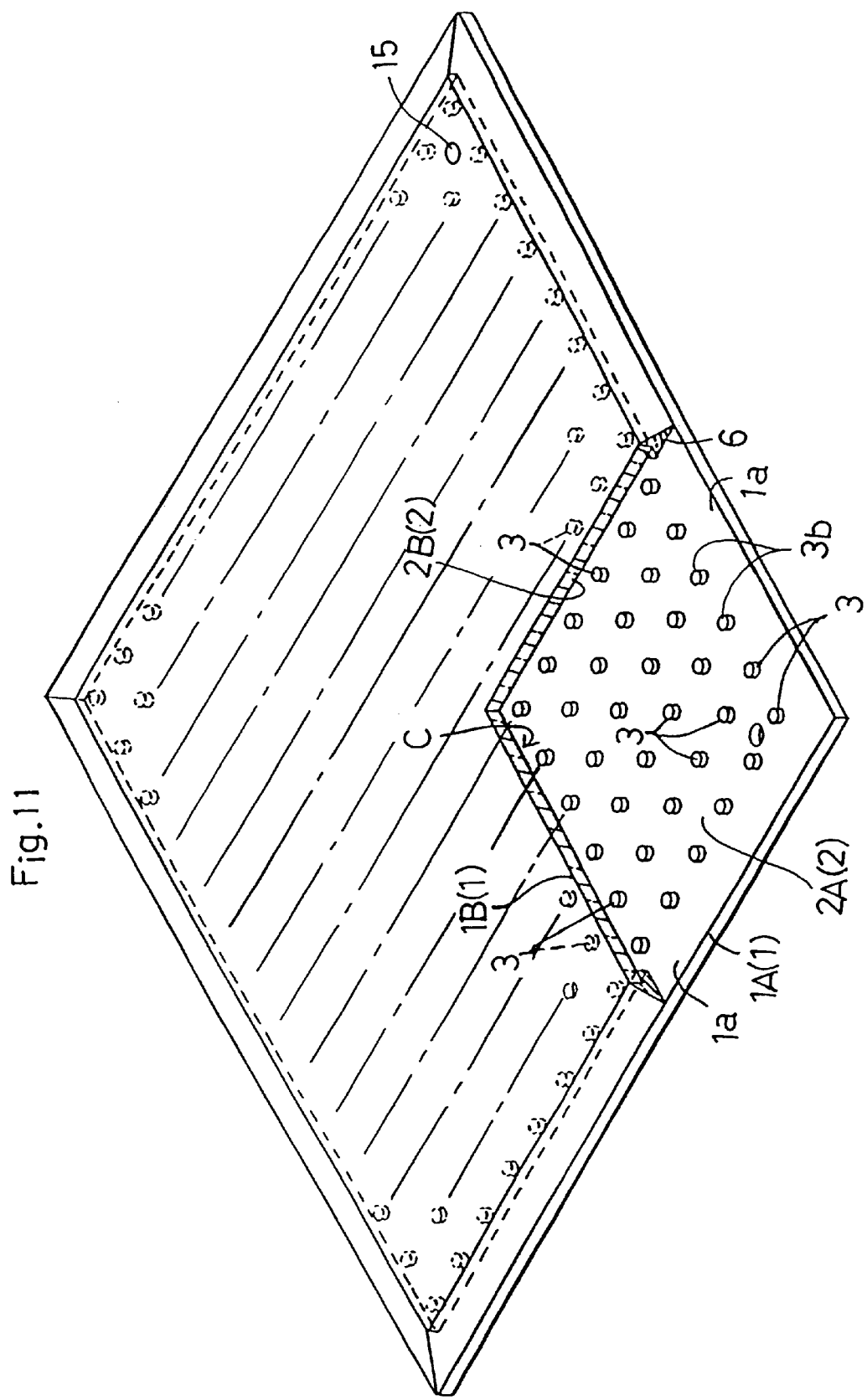
FIG. 11 is a partially cutaway perspective view showing an example of a glass panel.

The basic construction of the glass panel P relating to the invention is a glass panel P shown in FIG. 11 for instance. That is, a plurality of spacers 3 are interposed between paired first and second glass sheets 1A, 1B so as to form a space C between a first opposing face 2A of the first glass sheet 1A and a second opposing face 2B of the second glass sheet 1B; and peripheral edges 1a of these first and second glass sheets 1A, 1B are sealed by means of a sealing material 6 such as of a low-melting glass.

Figure 1:
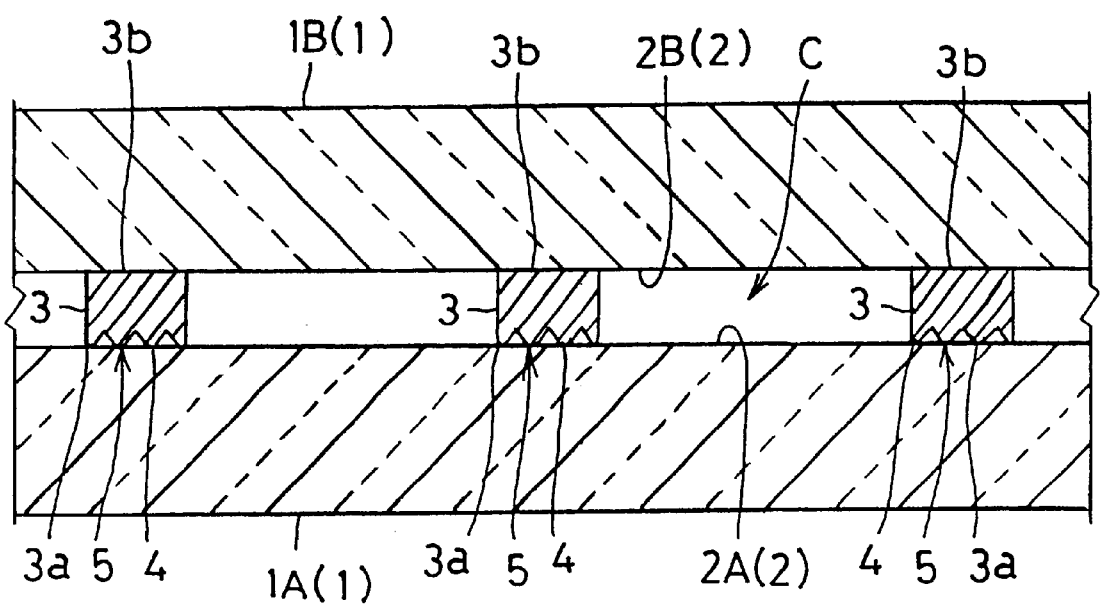
FIG. 1 is a vertical section view showing principal portions of an embodiment of a glass panel relating to the present invention.
Figure 2:
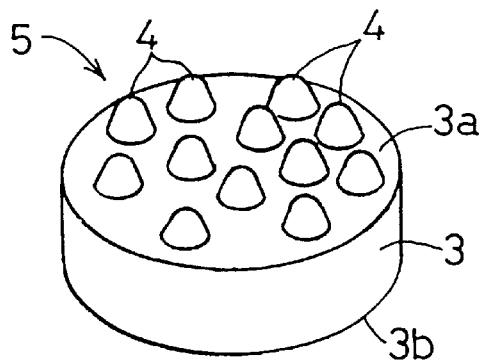
FIGS. 2 through 8 are perspective views showing examples of various spacer shapes.

More particularly, the glass panel relating to this first embodiment employs a spacer 3 shown in FIG. 1 for example. That is, one side 3a of this spacer 3 defines unevenness for providing a plurality of projections 4. The other side 3b of the spacer 3 is fixed to the second glass sheet 1B. The respective projections 4 are formed with a predetermined constant height from the other side 3b. The leading ends of these projections 4 function as a contact portion 5 capable of coming into contact with the first opposing face 2A of the first glass sheet 1A. In this case, the spacer 3 is movable relative to the first glass sheet 1A.

Figure 9:
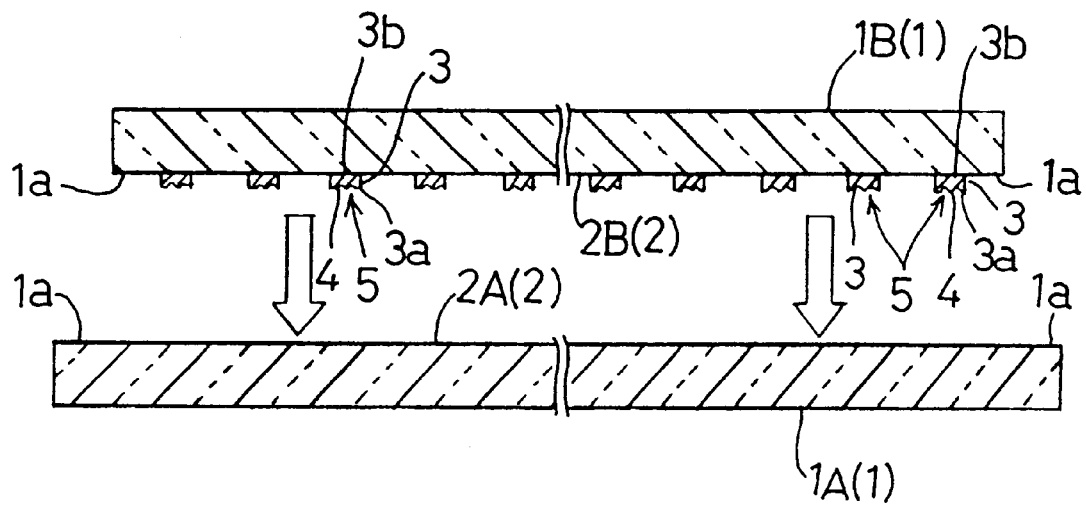
FIG. 9 and FIG. 10 are descriptive views illustrating an example of assembling a glass panel.
Figure 10:
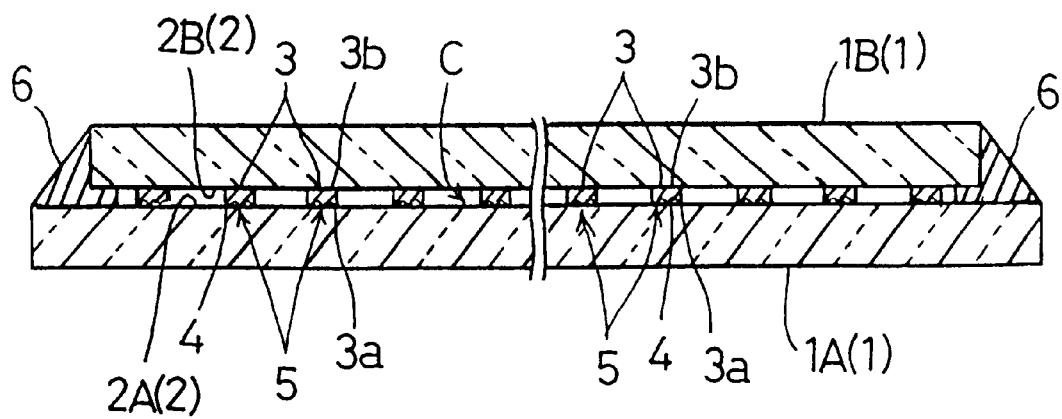

The assembly process of the above-described glass panel P will be described in greater details. As shown in FIGS. 9 and 10, the spacers 3 are disposed and fixed in advance with a predetermined distance therebetween on the one face, i.e. the second opposing face 2B, of the second glass sheet 1B. Then, onto the first glass sheet 1A horizontally placed, the second glass sheet 1B is superposed with its fixed spacers 3 oriented downward, i.e. with the second opposing face 2B oriented downward. Then, these superposed first and second glass sheets 1A, 1B are heated and the sealing material 6 is charged and filled at the peripheral edges 1 of the two glass sheets 1A, 1B. This sealing material 6 may be low-melting glass for example. Thereafter, the temperature is lowered to solidify the sealing material 6, thereby to seal the space C gas-tightly and the first and second glass sheets 1A, 1B are integrated together to form the glass panel P.

With this glass panel P, the inside of the space C may be evacuated, if necessary. In such case, the air inside the space C is evacuated through an evacuating hole 15 defined in advance in either one of the first and second glass sheets 1A, 1B; then, the evacuating hole 15 is sealed with low melting glass.

For fixing the spacers 3 to the face of the second glass sheet 1B, there is a method as follows, for example. Glass paste 7 is prepared by mixing glass frit (made of fine particles of crystalline low melting glass having a diameter of 1 to 200 μm) with an organic binder (for example, an organic material containing 90 wt. % of solvent and 10 wt. % of resin component is added thereto and then adjusted together into a paste 7 having a viscosity suitable for screen printing. Pine oil is employed as the solvent and a mixture consisting of 75 wt. % of ethyl cellulose and 25 wt. % of acrylic resin is employed as the resin component) and then mixing and kneading them together.

Then, by means of screen printing method or the like, a screen 10 is mounted on the second opposing face 2B of the second glass sheet 1B and the paste 7 is attached to predetermined positions (the printing diameter is 0.1 to 2.0 mm and height is about 20 μm or more), so as to form paste-formed members 8.

Figure 12:
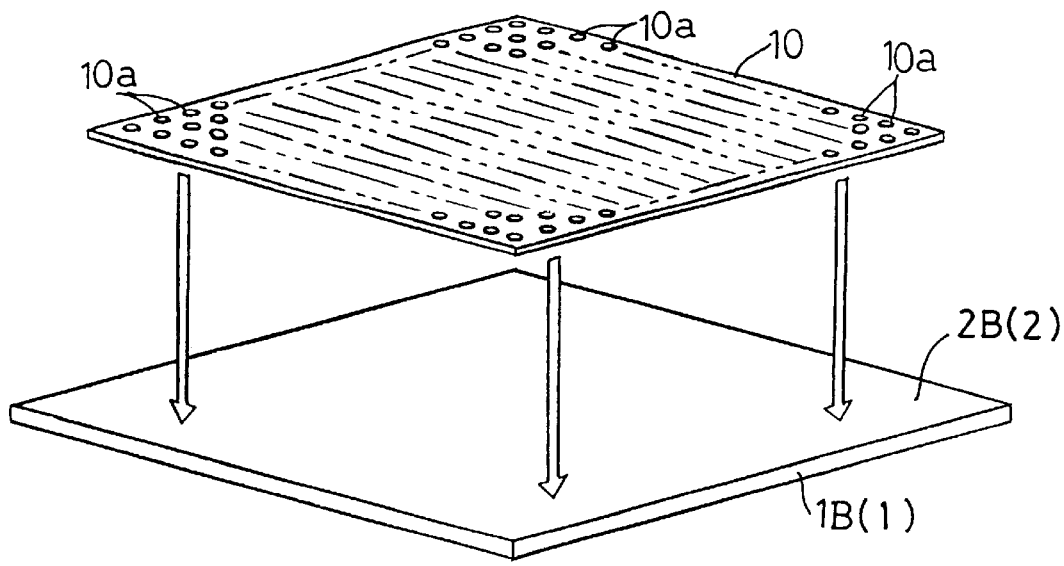
FIGS. 12 through 14 are step-illustrating perspective views for illustrating various arrangements and formations of the spacers.
Figure 13:
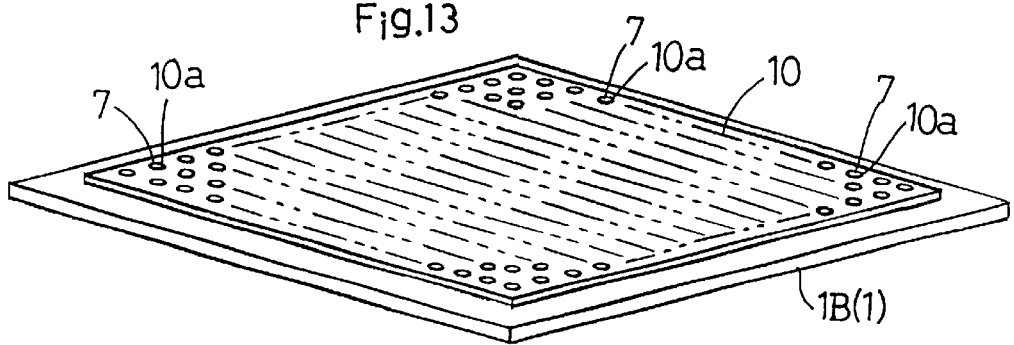
Figure 14:
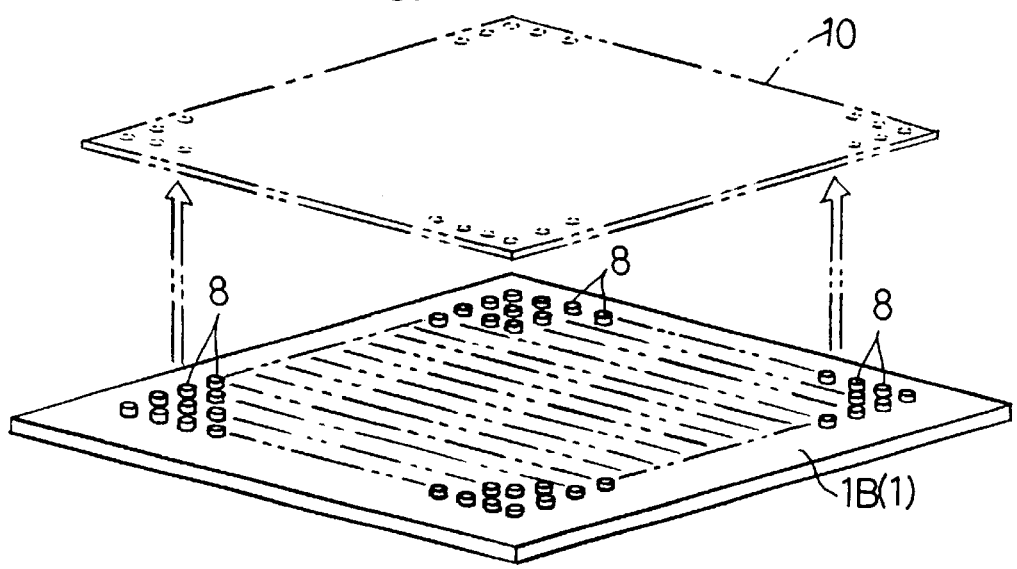

In order to form the paste-formed members 8 by means of screen printing, as illustrated in FIGS. 12 through 14, first, the screen 10 for forming the spacers 3 is set on the second opposing face 2B of the second glass sheet 1B. This screen 10 defines a number of through holes 10a at positions where the spacers 3 are to be disposed.

Then, as shown in FIG. 13, the paste 7 is extruded by a squeegee, and then the screen 10 is removed from the second glass sheet 1B. With this, the paste-formed members 8 having predetermined size and shape are formed on the second opposing face 2B (see FIG. 14). The thickness of this screen 10 is designed so that the height of the paste-formed members 8 may be greater than a predetermined value (e.g. 21 μm). The diameter of the through hole 10a is adjusted to correspond to the diameter of the paste-formed member 8 (e.g. 0.7 mm).

Thereafter, the formed paste-formed members 8 are heated together with the second glass sheet 1B so as to form pre-spacer forming members 30 by baking. The heating temperature of this case is 500 to 600° C., for example. The baked pre-spacer forming members 30 are gradually cooled, in the course of which at a temperature higher than their softening point, a press tool is applied against each pre-spacer forming member 30 to depress it to obtain a predetermined height (e.g. 20 μm) from one side 3a to the other side 3b, whereby the spacer 3 is formed. In this depressing operation, if a number of fine recesses are defined in the pressing face of the press tool, a plurality of projections 4 of a predetermined height may be defined in the one side 3a of each spacer 3.

As the press tool, a roll having a number of fine recesses in the surface thereof may be employed suitably. A roller having fine and precise knurling in the surface thereof too may be employed suitably.

Incidentally, a plurality of projections and recesses may be formed in the surface of the press tool, so that the projections will form the recesses and projections on the one side 3a of the spacer 3. With this, in the contact portion 5 of the one side 3a, non-contact portions relative to the first opposing face 2A of the first glass sheet 1A are formed in the form of recesses. As a result, heat conduction may be restricted without making the contact portion 5 smaller. Incidentally, other faces than these recesses too will be referred to as projections.

Incidentally, the plurality of projections 4 may be formed in the one side 3a of the spacer 3 also by grinding using abrasive grains in combination with a flat pressing surface of the press tool. As the abrasive grains, a sand paper or the like may be employed.

These projections 4 formed in the above-described manners provide the contact portion 5 for the first opposing face 2A (see FIG. 1).

The second glass sheet 1B to which the spacers 3 have been attached as described above is then superposed on the horizontally placed first glass sheet 1A via the spacers 3. Then, the peripheral edges 1a are heated and sealed with the sealing material 6 made of low melting glass, whereby the glass panel P is formed (see FIG. 10). As the low melting glass employed as this sealing material 6, such glass having a lower softening point than the pre-spacer forming member 30 is employed. Preferably, the glass has a softening point of 100° C. or lower.

Incidentally, if crystalline low melting glass is employed as the spacer 3, even if the glass has a softening point about same as that of the pre-spacer forming member 30, the pre-spacer forming member 30, after cooling subsequent to the formation of the contact portion 5, may be crystallized to obtain a higher softening point if the cooling rate is maintained within a predetermined range. Therefore, in the subsequent sealing step, even if such low melting glass having about same softening point as its original softening point is employed for sealing the peripheral edges 1a of the glass panel P, the sealing step may be effected without softening of the pre-spacer forming members 30.

In case the space C is to be evacuated, after completion of sealing of the peripheral edges 1a, the air present inside the space C is evacuated through an evacuating hole 15 defined in e.g. the second glass sheet 2B and then the evacuating hole 15 may be sealed with the glass (see FIG. 11). The air pressure of this space C is preferably below $10^{-2}$ torr.

Incidentally, if the sealing operation is effected in vacuum, the evacuating hole 15 need not be provided.

The glass panel P manufactured in the above-described manner has the space C of e.g. about 20 μm, yet has a thickness about same as that of generally employed laminated glass. Accordingly, in mounting it to a sash for instance, it may be mounted directly to a sash adapted for the conventional laminated glass.

Between the interposed spacers 3 and the first glass sheet 1A, contact is provided by the projections 4 of the spacers 3, so that the heat-transfer resistance at the border is enhanced sufficiently. Moreover, the projections 4 are distributed over the entire surface of the one side 3a of the spacer 3, so that the contact takes place at a number of points. Hence, the contact portion 5 comprised of the projections 4 is prevented from exerting an external force to the first glass sheet 1A in a locally concentrated manner. As a result, there is no sharp slope in the stress distribution in the surface of the first glass sheet 1A, thereby to effectively restrict development of crack in the first glass sheet 1A.

Further, if the spacers 3 are fixed to the second glass sheet 1B as in the above, the first glass sheet 1B may be maintained with any desired posture, so that the assembly of the glass panel may be facilitated. Moreover, if the space C of the glass panel P is maintained under vacuum, as vacuum layer provides excellent heat insulating performance, the space C may be formed very thin. Accordingly, the thickness of the glass panel P may be about same as that of conventional glass sheet.

[Alternative Embodiments in the First Embodiment]

Next, alternative embodiments not disclosed in the foregoing embodiment will be described.

(1) The projections 4 to be formed in the spacer 3 need not be formed only in the one side of the spacer 3, but in both sides thereof. With this, the contact area to the two glass sheets 1 may be reduced, so that the heat-transfer resistance between the first glass sheet 1A and the second glass sheet 1B may be increased, and the heat insulating performance of the glass panel P may be further improved accordingly.

Figure 3:
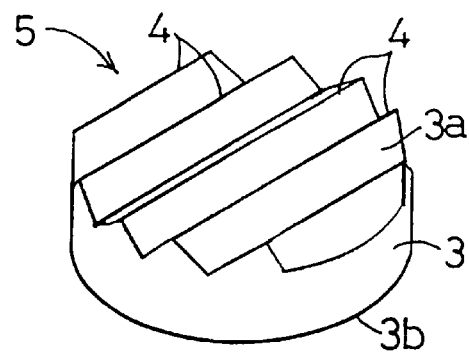

Further, the spacer 3 may be formed by interconnecting the projections of the pre-spacer forming member 30 having the projections 4 in one side or both sides thereof (2) The projections 4 to be formed in the spacer 3 are not limited to the form of dots. Instead, as shown in FIG. 3, the projections 4 may be provided in the form of fine ridges formed on the one side 3a of both sides of the spacer 3.

Figure 4:
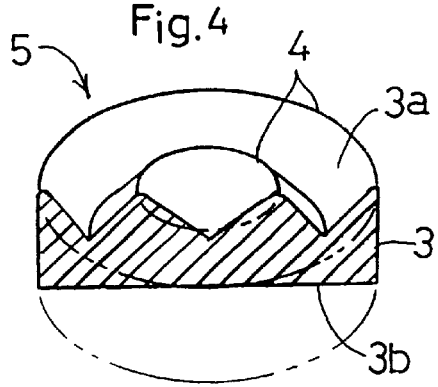

Further, as shown in FIG. 4, annular grooves and annular projections 4 may be formed in a concentric pattern.

Figure 5:
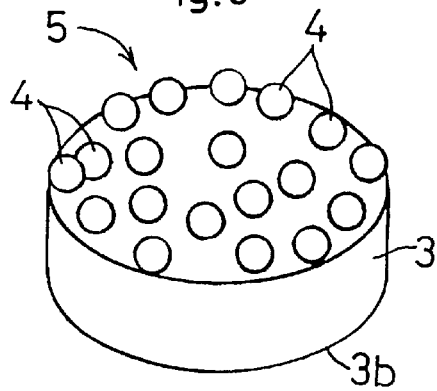

Moreover, as shown in FIG. 5, fine particles separately provided may be fixed to the end of the spacer 3 in the form of projections therefrom. Such projections 4 may be provided by mixing fine particles of silicon oxide mixed in the paste 7 described in the foregoing embodiment and causing these particles to project from the side of the spacer 3. Alternatively, the projection forming fine particles may be sprinkled over the side of the un-solidified pre-spacer forming member 30 and then pressed into the prespacer forming member 30 when the press tool is applied thereto for adjusting the height of the contact portions 5.

Further alternatively, the pre-spacer forming member 30 may be formed by preliminarily sprinkling the projection forming fine particles over the side of the paste forming element 8.

Figure 6:
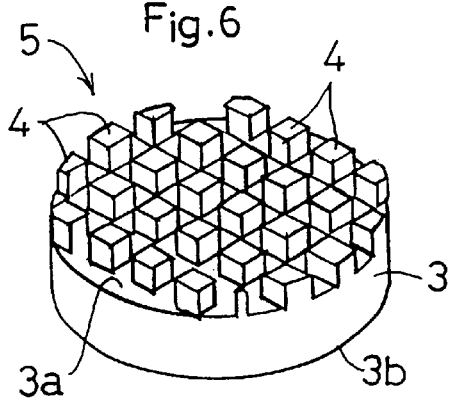

In addition to the above, as shown in FIG. 6, the projections 4 may be formed by disposing square columns in a grating pattern. In this case, on the one side 3a of the spacer 3, the projections 4 may be formed by equidistantly juxtaposing a plurality of grooves having a hook-like cross section in an orthogonal arrangement.

Figure 7:
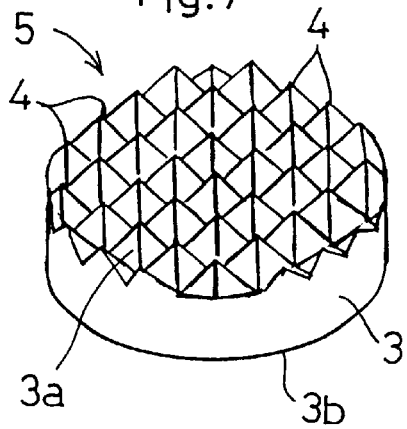

As shown in FIG. 7, the projections 4 may comprise quadrangular pyramids arranged in a grating pattern. In this case, in the end face of the one side 3a of the spacer 3, a plurality of triangular grooves having an inverse triangular cross section are disposed at right angles with each to form the projections 4.

Figure 8:
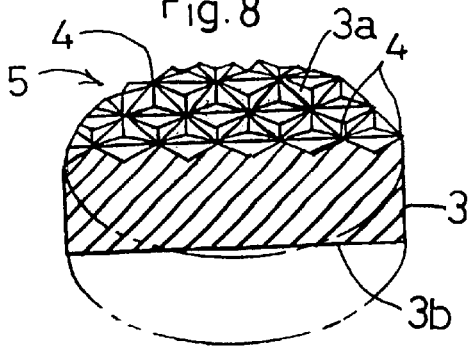

As shown in FIG. 8, a plurality of recesses in the form of inverse triangular pyramids may be juxtaposed to form projections and recesses, so that their crest lines form the projections 4. In this case, in the pressing face of the press tool capable of forming the projections 4, three groups of triangular grooves having an inverse triangular cross section and equidistantly disposed are formed at an angle of 60° relative to each other, so that such pressing face when pressed against the end face of the one side 3a of the spacer 3 may form the projections 4.

(3) For forming the plurality of projections 4 in the one side of the spacer 3, it is also conceivable to form a plurality of recesses in the one side to provide recesses and projections, so that the portions between the adjacent recesses may form the projections 4. For instance, as shown in FIG. 4, it is conceivable to form a central recess and a plurality of annular recesses around it, so that the annular projections between the recesses may form the projections 4.

Further, it is also conceivable to form a plurality of grooves in any appropriate direction in the one side, so that the portions between the grooves may form the projections 4. For instance, the plurality of projections 4 may be formed by grinding the side face of the spacer 3 with a grinding stone, sand paper, an abrasive cloth having abrasive grains.

(4) The glass panel P is not limited to the above-described type of panel comprised of two glass sheets 1. Further, to either one glass sheet 1 forming the glass panel P, other glass sheets 1 may be attached via spacers 3 on the both sides of the one sheet. That is to say, the glass panel P may be comprised of more than three glass sheets.

Further, it is also conceivable to superpose a plurality of sets of glass panels, each set consisting of two glass sheets 1. In this case, the space between the glass panels P may be formed as the space C described above. Instead, they may be simply superposed with each other.

(5) The space C of the glass panel P is not limited the vacuum space, but it may be simply pressure-reduced. By reducing the air pressure alone, the heat transfer rate may be reduced. It is also conceivable to charge into the space C certain gas having a high heat transfer coefficient. In this case, it is more preferable if the pressure of such charged gas be reduced.

Figure 17:
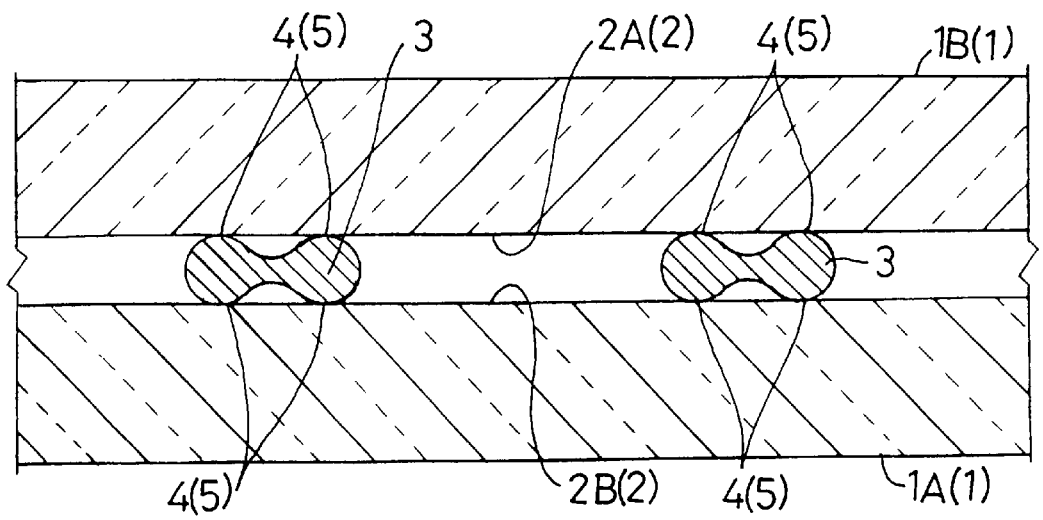

(6) As the spacer 3, in addition to those described in the above (2), it is also conceivable to form the contact portion 5 at a peripheral edge 1a of a column-like portion 25, with the intermediate portion of such peripheral edge 1a being recessed and formed narrow. For instance, as shown in FIG. 17, the spacer may be shaped in the form of an elliptical or oval body of revolution, with its longitudinally intermediate portion being reduced in diameter. In this shape, the portion forming the large-diameter contact portion 5 too will be referred to as the projection 4. In short, the spacer may be formed such that it forms the projections and recesses as seen sideways. In this case, in addition to the example shown in FIG. 17, a plurality of diameter-reduced portions may be formed.

Incidentally, the spacer 3 may be formed in the shape of a circular disc, with centers of its contact portions 5 for the opposing faces 2A, 2B being recessed respectively so as to provide a cross section as shown in FIG. 17.

Figure 15:
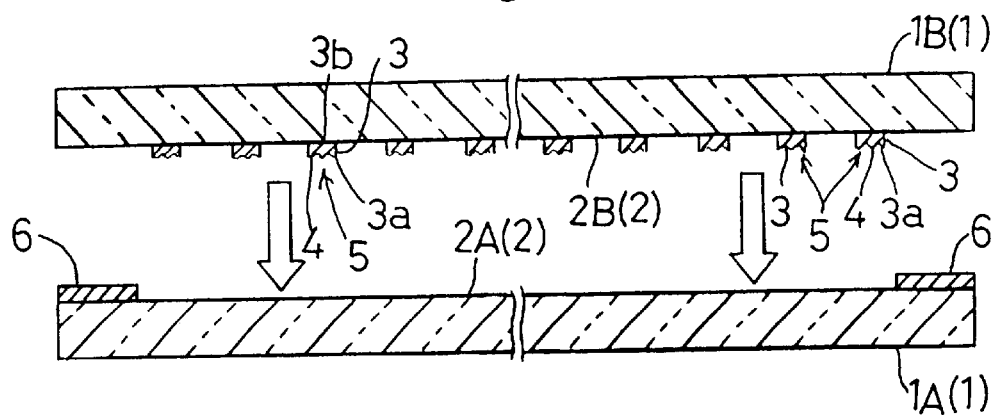
FIGS. 15 through 19 are section views of principal portions of a glass panel illustrating other examples of spacer.
Figure 16:
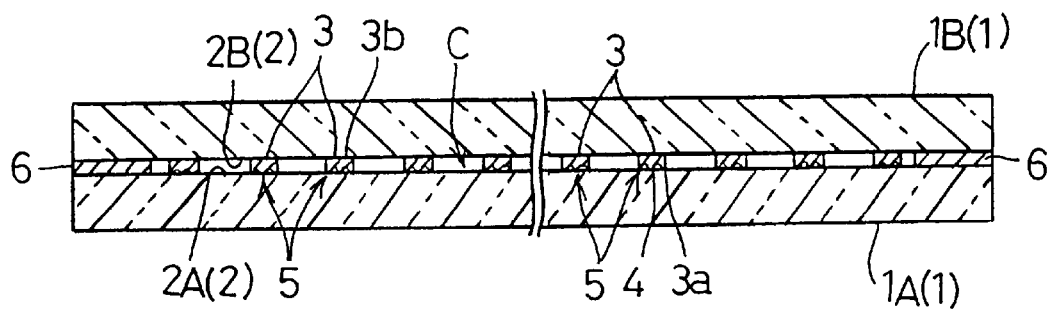

(7) In the case of the glass panel P illustrated in FIGS. 9 and 10, on the first glass sheet 1A, the second glass sheet 1B is superposed via the spacers 3 and the sealing glass is fused onto the peripheral edge 1a of the second glass sheet 1B for sealing it. In addition to this, as illustrated in FIGS. 15 and 16, for instance, it is also conceivable to fix the spacers 3 to the opposing face 2B of the second glass sheet 1B. Then, the sealing low-melting glass paste 7 is set by means of printing or the like, to the peripheral edge 1a of the first glass sheet 1A which is disposed flat in advance. Thereafter, the glass sheets are baked in this superposed condition in the vacuum oven which is maintained at the baking temperature (e.g. 400 to 500° C.) under the vacuum, whereby the glass panel P may be formed.

In this case, the low melting glass set at various positions may be reliably degassed and defoamed. In order to promote this defoaming, the baking temperature should be raised by 20 to 30° C. After combining the first glass sheet 1A and the second glass sheet 1B together, the assembly is cooled under the vacuum, whereby a vacuum glass panel P may be formed. With this method, automization is possible, so that mass-production becomes possible.

Figure 18:
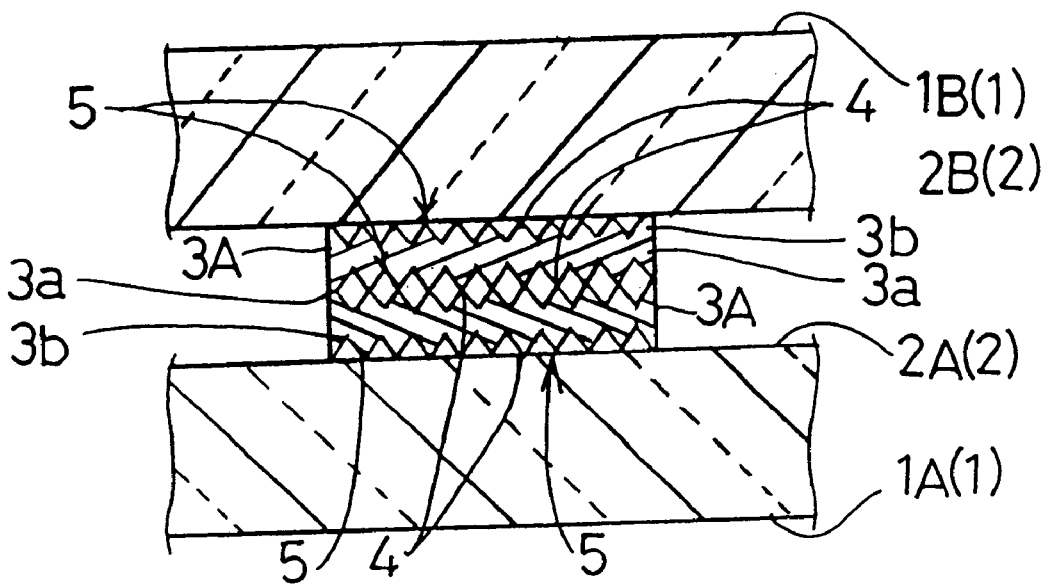

(8) The spacers 3 need not be fused to the second glass sheet 1B. Further, as shown in FIG. 18 for instance, the spacer may comprise split spacers 3A superposed within the distance of the space C.

As for its shape, for instance, both one side 3a and the other side 3b thereof may be provided as the contact portions 5 having the projections 4 respectively, so that the contact portions 5 of the one sides 3a of the split spacers 3A are placed in contact with each other.

Figure 19:
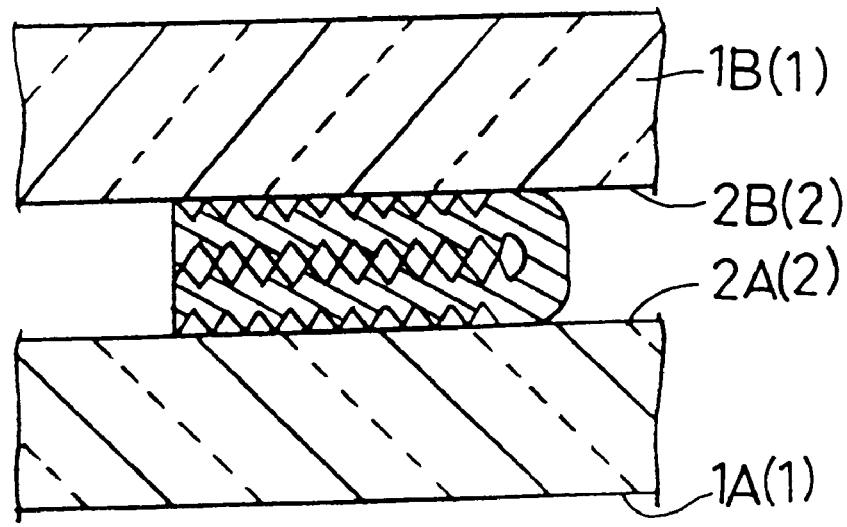

With this construction, the sufficient contact area between the contact portions 5 formed at the other ends 3b of the split spacers 3A and the respective opposing faces 2A, 2B of the two glass sheets 1A, 1B may be assured, while the contact area between the respective opposing faces 2A, 2B and the contact portions 5 may be small, so that the heat resistance of both opposing faces 2A, 2B may be increased Moreover, through the contact between the contact portions 5 of the one sides 3a, the heat resistance within the spacer 3 too may be increased. Incidentally, the above-described split spacers 3A superposed on the other may be made of different materials. And, the one side 3a of one split spacer 3A may be formed as a flat face. In addition, as shown in FIG. 19 for instance, the split spacers 3A may be interconnected at one sides thereof, so as to be combined together. With this construction, while the above-described features are maintained, the spacer 3 having the contact portion 5 in the mid portion thereof may be handled as one unit.

(9) In the foregoing embodiment, the paste 7 is screen-printed on the second opposing face 2B. Instead, this printing of the spacer 3 on the second opposing face 2B may be carried out by any other conventional printing method such as the surface printing, copperplate printing, lithography, or the like.

Further alternatively, it is also conceivable to set a photosensitive film on the second opposing face 2B. Then, this photosensitive film will be exposed at positions thereof where the spacers 3 are to be disposed. After the exposed portions are removed, the paste 7 will be charged therein to form the paste formed members 8, which will then be baked to form the spacers 3. The remaining photosensitive film may be removed in the course of the baking operation for forming the spacers 3. Further, the paste 7 may be formed into the paste formed members 8 by means of other printing method utilizing a functional membrane and then baked to form the spacers 3.

(10) The method of forming the paste formed members 8 used for formation of the spacers 3 may employ a dispenser, instead of the above-described printing. For instance, the dispenser will be manipulated by means of a manipulator or a robot hand for discharging the paste 7 at predetermined positions so as to form the paste formed members 8 of a predetermined shape. In this case, for forming the respective paste formed members into a predetermined height, a press tool may be employed.

(11) The spacer 3 is not limited to the low melting glass spacer 3 described in the foregoing embodiment. Instead, it may be made of stainless steel, nickel alloys containing nickel-based super alloy such as inconel alloy 718, or any other metallic, crystal glass ceramic or the like. In short, it may be made of any material which is hardly deformed when exposed to an external force so as to prevent contact between the first glass sheet 1A and the second glass sheet 1B.

(12) When the spacer 3 is made of metal, sintered metal compact is preferably employed, for its small heat-transfer cross section. In this respect, an HIP sintered compact which was sintered by the high-temperature isotropic sintering (so-called HIP) for increased porosity may be employed even preferably. This is because the HIP sintering method allows higher porosity for the sintered compact in comparison with other conventional sintering methods and allows also for increased strength.

Further, the material for forming the spacer 3 is not limited to glass or metal. Instead, any material having high heat resistance such as synthetic resin may be employed. That is to say, if the spacer 3 is formed of rubber material for instance, when the glass panel undergoes such deformation as flexion due to an external force, this deformation may be elastically absorbed, thus protecting the glass sheets 1 from breakage.

Incidentally, in selection the material forming the spacer 3, it is necessary to take into consideration such factors as the brittle fracture property inherent in glass sheets, hardness and disposing distance of the spacer 3, the number of projections 4 forming the contact portion 5, their disposing distance, shape of leading ends (especially, the radius of the spherical surface), etc. In this respect, for prevention of breakage of the glass sheet 1, in addition to the brittle fracture property, it is also needed for the internal stress of the glass sheet 1 not to be too high. To this end, the material (especially hardness) of the spacer 3 and the radius of the spherical face or disposing distance of the leading end of the projection 4 will be important.

[Second Embodiment]

The glass panel relating to the present invention may employ spacers 3 described next.

Figure 20:
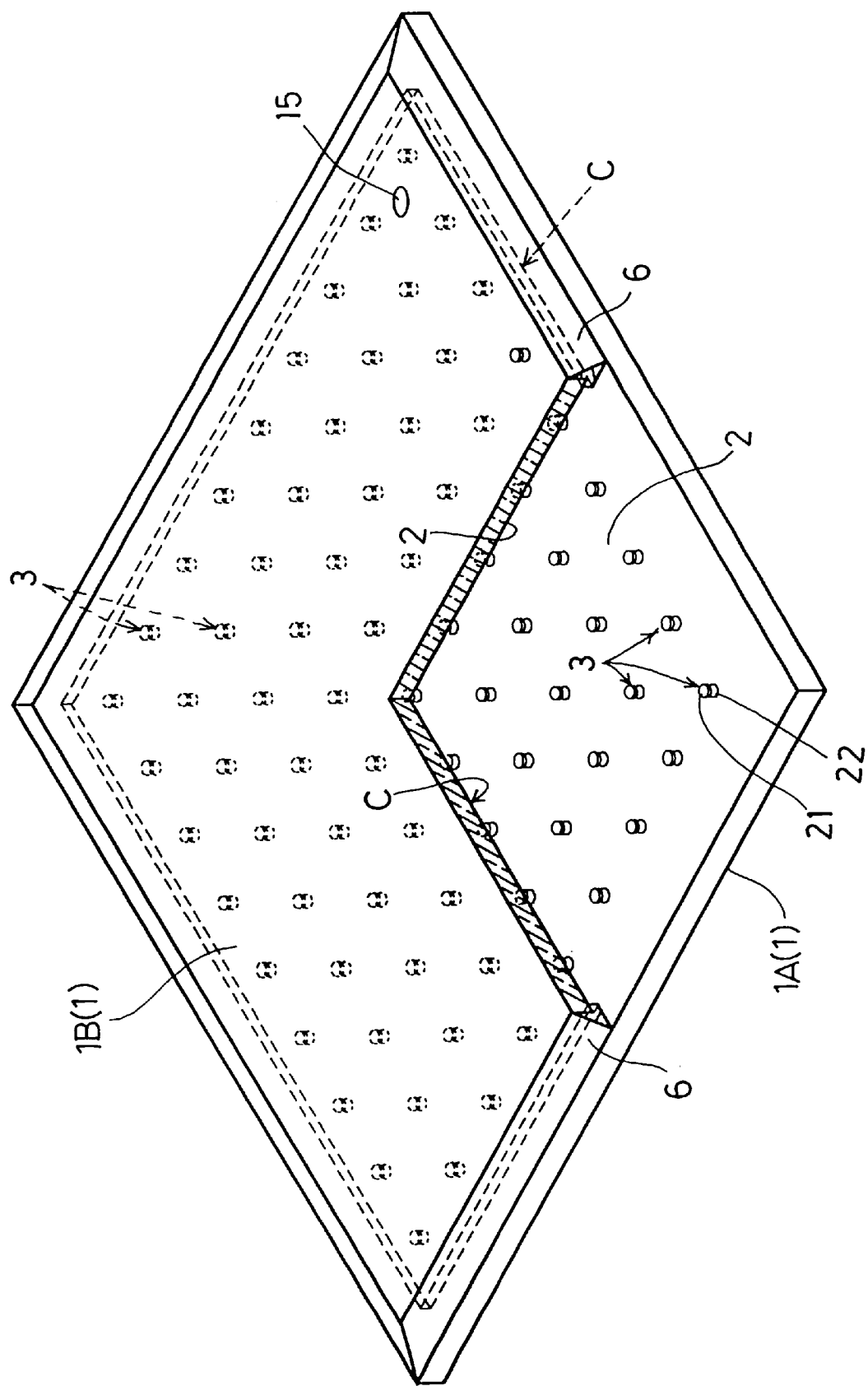
FIG. 20 is a partially cutaway perspective view showing an example of a glass panel relating to a second embodiment.
Figure 21:
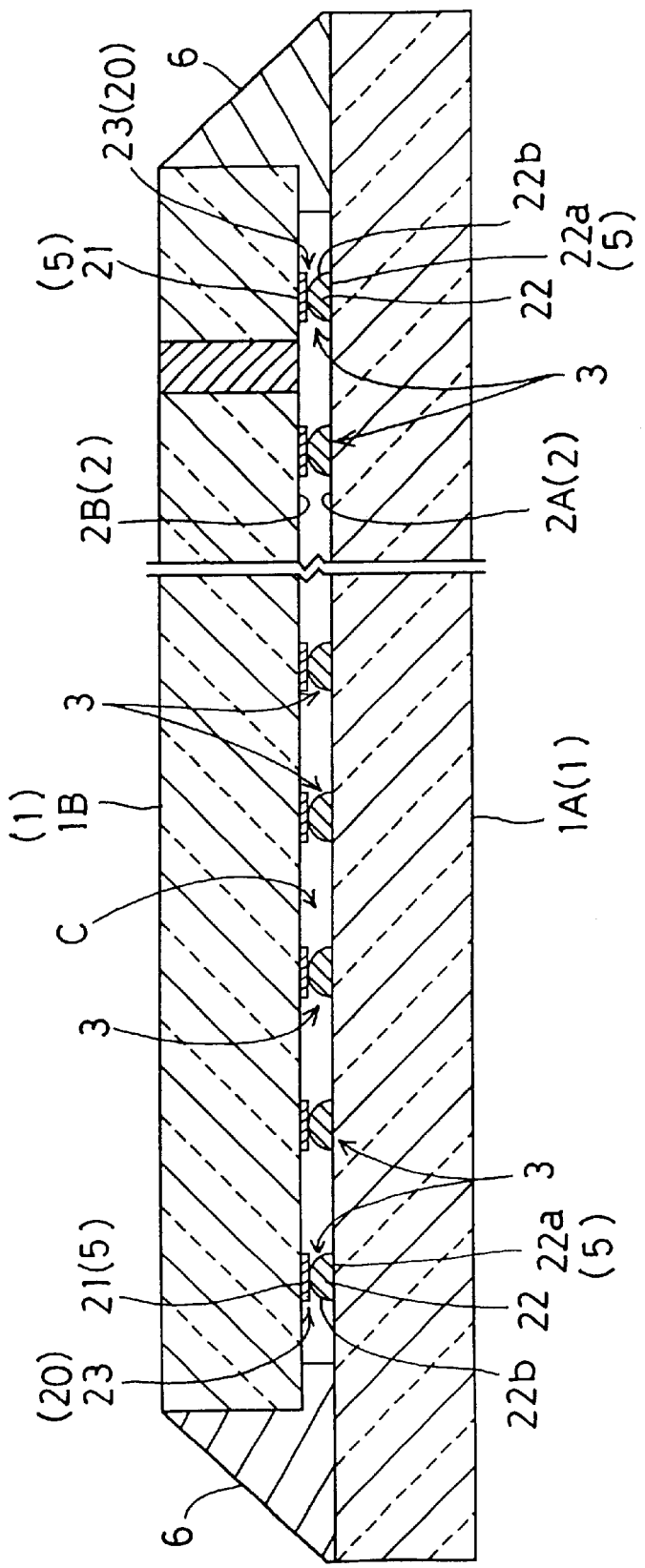
FIG. 21 is a side view in vertical section of the glass panel shown in FIG. 20, FIGS. 22 through 26 are vertical section views of a glass panel illustrating an example of spacer relating to the second embodiment.
Figure 22:
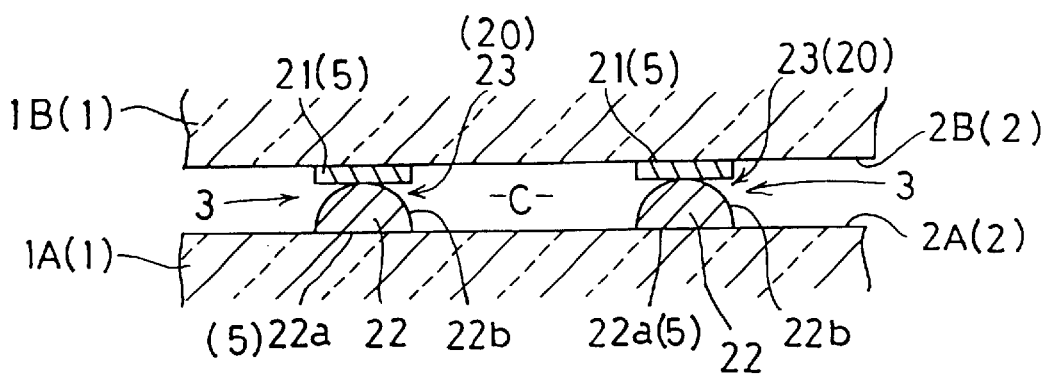

As shown in FIGS. 20 through 22, the spacer 3S includes a flat plate portion 21 capable of coming into contact with the second opposing face 2B of the second glass sheet 1B and a base portion 22 formed integral with the flat plate portion 21. A bottom 22a of the base portion 22 comes into contact with the first opposing face 2A and the flat plate portion 21 comes into contact with the second opposing face 2B.

The bottom 22a of the base portion 22 has an outer face 22b which is formed as a revolving surface; and the top of the base 22 and the rear side of the contact portion 5 form a border portion 23, which has a reduced cross sectional area so as to act as a constricted passage for heat conduction.

That is, in the heat conduction of a solid body, the amount of heat conduction varies in inverse proportion to the direction of heat flux and varies in proportion to the cross sectional area in that direction. Hence, such portion having a reduced cross sectional area as seen from the direction of heat flux restricts the amount of heat conduction. Therefore, the border portion 23 may act as a heat-transfer resisting portion 20.

Incidentally, the above-described spacer 3 may be formed of glass for example. Referring to one example of its manufacturing method, a thin glass plate is cut into a piece of a predetermined shape and one side thereof is etched to form the base portion 22 and this is fused with another thin glass plate to be formed integral therewith.

Further, in place of glass, the spacer 3 may also be formed of plastics such as polypropylene or metal such as stainless steel (e.g. SUS304, SUS316, etc) or ceramic material as well.

According to the above-described construction, in the condition where the contact portions 5 are placed in contact with the first and second opposing faces 2A, 2B of the glass sheets 1, the spacer will not roll unlike the conventional spherical spacer 3 and may be disposed stably in position. And, since the two contact portions 5, 5 are placed into contact with the first and second opposing faces 2A and 2B of the first second glass sheets 1A, 1B, the contact area for the glass sheets 1A, 1B is greater than that of the conventional spherical spacer 3. Accordingly, stress concentration from the spacer 3 to the glass sheets 1 may be reduced and breakage of the glass sheets 1 due to stress concentration may be avoided. Moreover, since the heat-transfer resisting portion 20 having a smaller heat transferring cross sectional area is formed while the contact portions 5 of the spacer 3 are placed in contact over relatively large areas with the opposing faces 2A, 2B of the glass sheets 1, the amount of heat conduction between the two glass sheets 1A, 1B may be maintained small.

Figure 23:
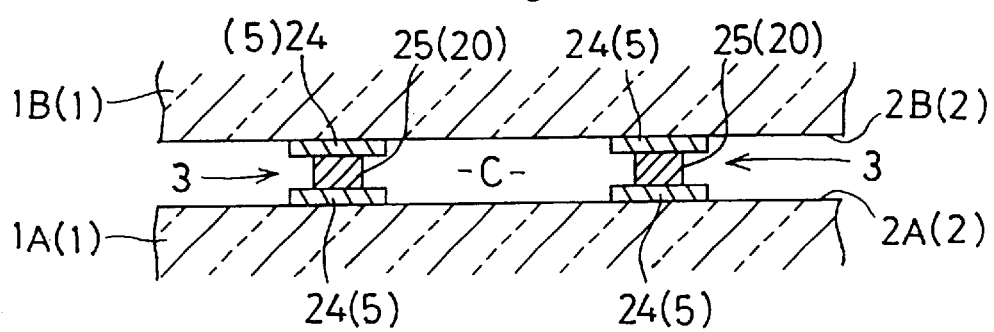

[Alternative Embodiments in the Second Embodiment]
(1) In the second embodiment described above, the outer face 22b of the base portion 22 is formed as a revolving surface. Instead, as shown in FIG. 23, it is also possible to form the contact portions 5 coming into contact with the opposing faces 2A, 2B as plate-like portions 24 and to form the portion between these plate-like portions 24 as a column-like portion 25.

The cross sectional area of this column-like portion 25 is designed to be smaller than the area that the plate-like portions 24 come into contact with the opposing faces 2A, 2B. In this construction too, the column-like portion 25 functions as a heat-transfer resisting portion 20.

Figure 24:
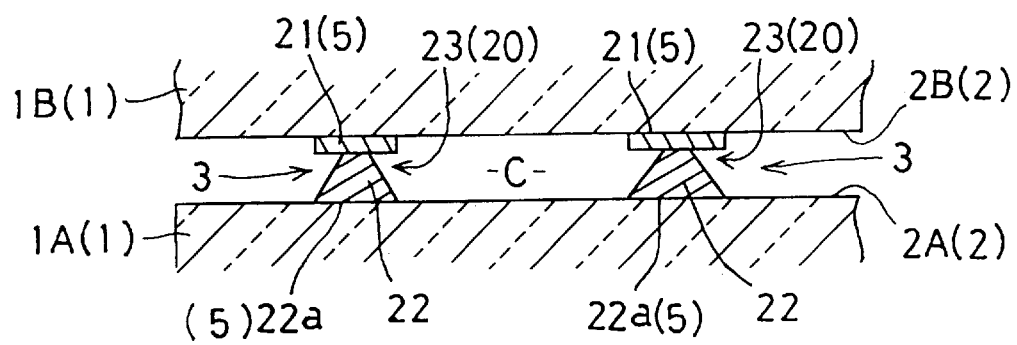

(2) The outer face 22b of the base portion 22, as shown in FIG. 24, may be provided in the form of a truncated cone. This truncated-cone like base portion 22 is bonded with a flat plate portion 21 having a greater area than the top face of the base portion 22, so that the base portion 22 and the flat plate portion 21 are formed integral with each other.

With this construction, as the top face of the base portion 22 provides the minimum cross section of the spacer 3 when formed integral with the flat plate portion 21, the border portion 23 between the base portion 22 and the flat plate portion 21 may form the heat-transfer resisting portion 20.

Figure 25:
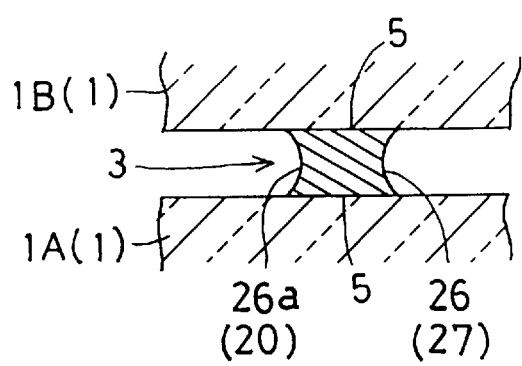
Figure 26:
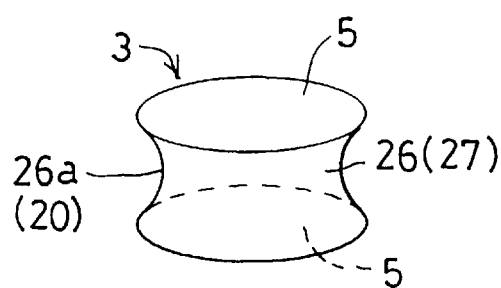
Figure 27:
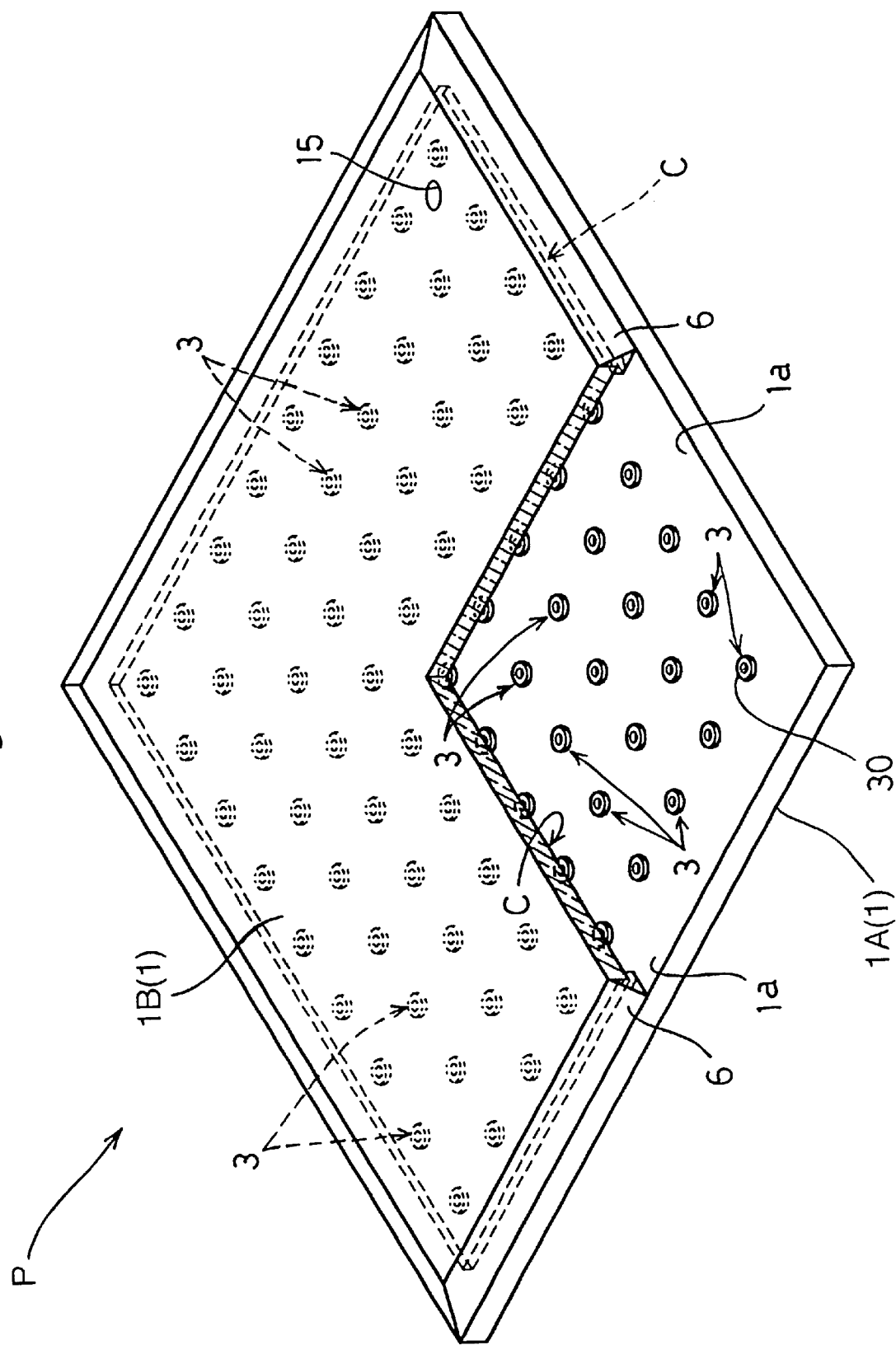
FIG. 27 is a perspective view showing an outer appearance of a glass panel relating to a third embodiment.

(3) As shown in FIGS. 25 and 26, the spacer 3 may be formed as one column-like portion 25 whose peripheral wall 26 defines a concave portion 27 along the entire periphery thereof With this construction, a receded portion 26a having a smaller cross section as formed by the concave portion 27 may form the heat-transfer resisting portion 20.

[Third Embodiment]

In the glass panel relating to the present invention, the spacer 3 may be constructed as described next. Namely, the spacer 3 according to this third embodiment is intended especially to improve the transparency of the window pane.

In this embodiment, there are employed spacers 3 as shown in FIGS. 27 through 32 for instance. These spacers 3 include a first contact portion 5a for contacting the first glass sheet 1A and a second contact portion 5b for contacting the second glass sheet 1B. In this embodiment, from the first contact portion 5a through the second contact portion 5b, there is formed a through portion 30 of a hole like or substantially hole like shape. With formation of this through portion 30, the transparency of the glass panel when it is seen through is improved.

Figure 28:
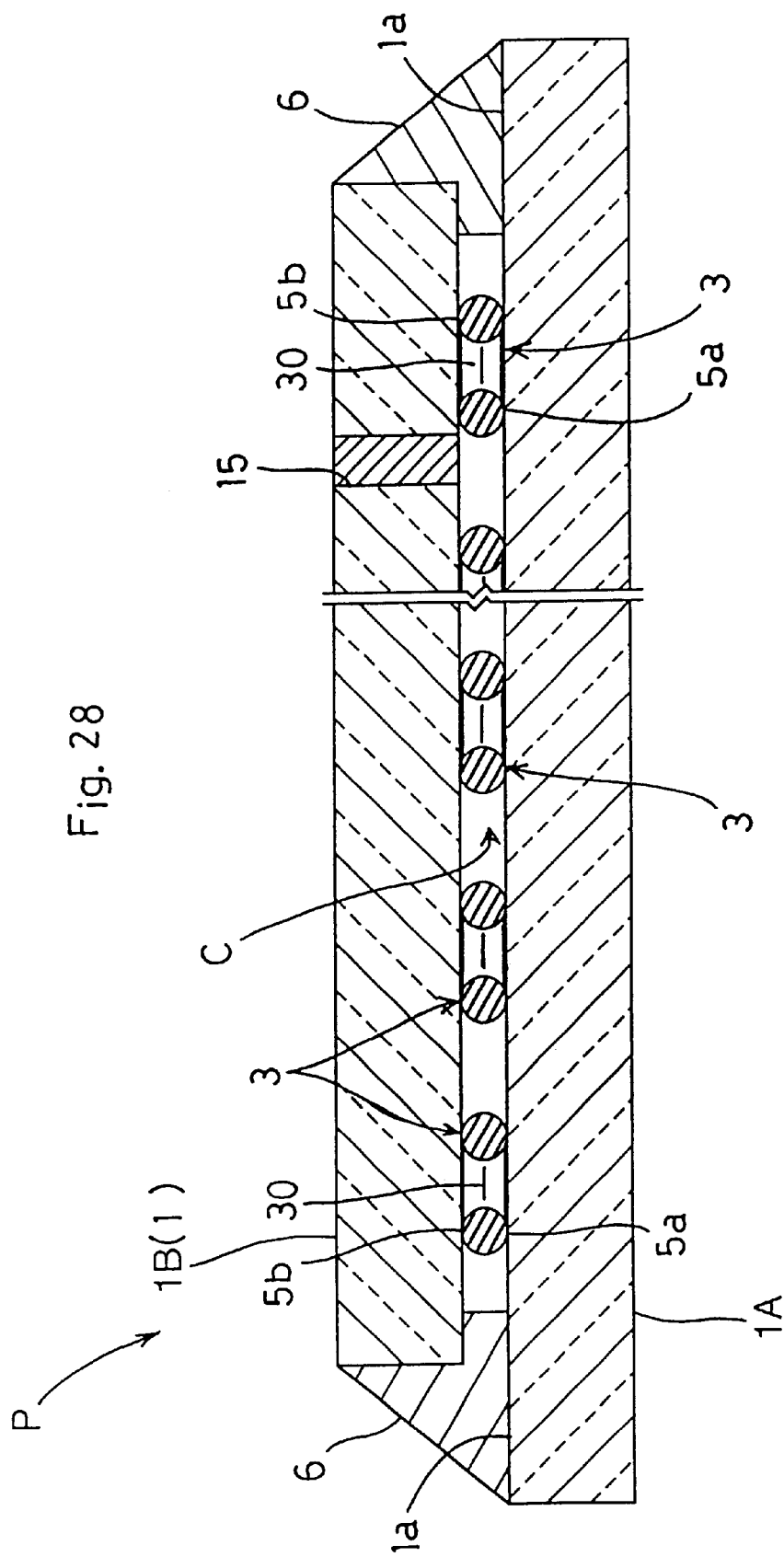
FIG. 28 is a section view of a glass panel relating to the third embodiment.
Figure 29:
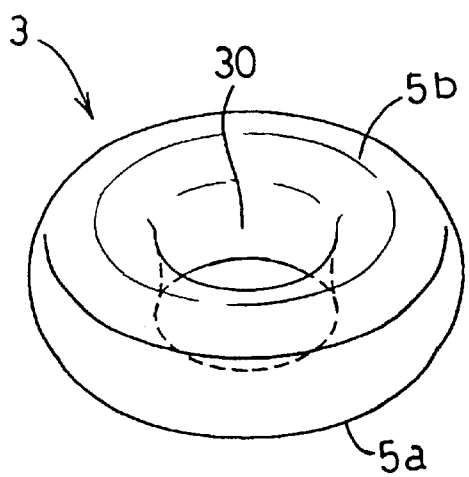
FIGS. 29 through 32 are descriptive views showing outer appearances of spacers relating to the third embodiment.

The first contact portion 5a and the second contact portion 5bformed in the spacer 3, as shown in FIGS. 28 and 29 for instance, are formed such that the first contact portion 5a comes into line contact with the first glass sheet 1A and the second contact portion 5b comes into line contact with the second glass sheet 1B, respectively. With this construction, while the transparency of the spacer 3 is maintained favorably, the heat conduction between the first glass sheet 1A and the second glass sheet 1B may be reduced, so that a glass panel P having superior heat insulating performance may be obtained.

Figure 30:
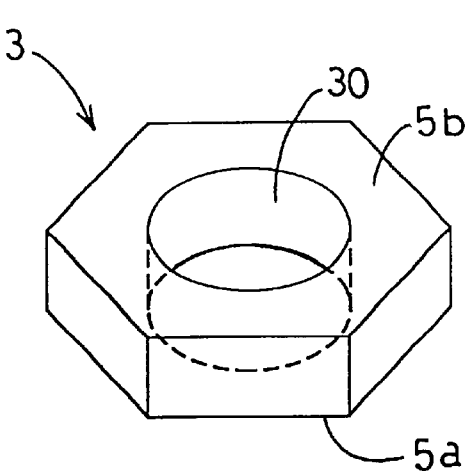
Figure 31:
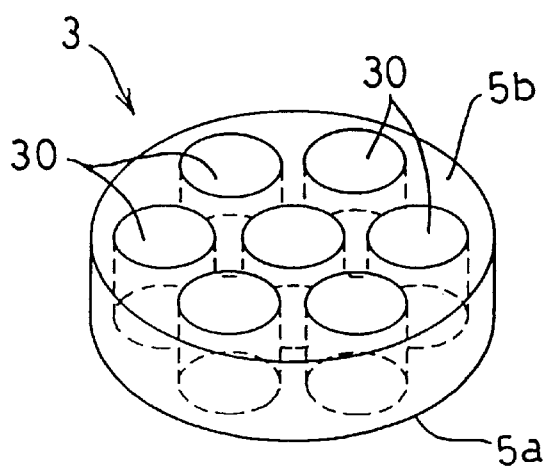
Figure 32:
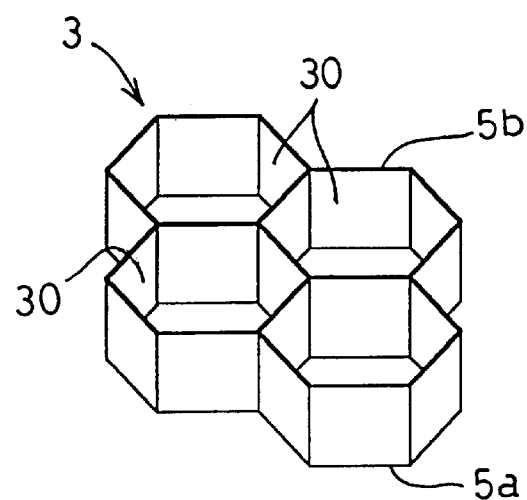

In addition to the above, the spacer 3 may be embodied also as shown in FIGS. 30 through 32.

In FIG. 30, the first contact portion 5a and the second contact portion 5b come into not line contact but slightly face contact with the first glass sheet 1A or the second glass sheet 1B. The spacer 3 of this embodiment supports the first glass sheet 1A and the second glass sheet 1B with a greater contact area. This construction is effective, for example, in case prevention of damage or crack of the glass sheets through restriction of stress concentration at the contact portions of the glass sheets 1 relative to the spacer 3 is more desired than the reduction of heat construction between the first glass sheet 1A and the second glass sheet 1B.

In FIGS. 31 and 32, the spacer 3 defines a plurality of through portions 30. In these cases too, by restricting stress concentration occurring in the first glass sheet 1A and the second glass sheet 1B, damage or crack of the first glass sheet 1A or the second glass sheet 1B may be prevented.

Regarding the material forming the spacers 3, it is necessary that the material not be easily deformed or collapsed when press-fit between the first glass sheet 1A and the second glass sheet 1B so as to maintain constant the distance between the first glass sheet 1A and the second glass sheet 1B. Further, it is preferred that the material have good high-temperature resistance, low heat-conducting property, good workability and so on.

Preferred materials include, for instance, various kinds of metal such as stainless steel, aluminum, ceramics, mineral, carbon fibers, and so on.

Next, there will be described an example of manufacturing the glass panel under the atmospheric pressure environment, using the spacer 3 of this embodiment.

Figure 33:
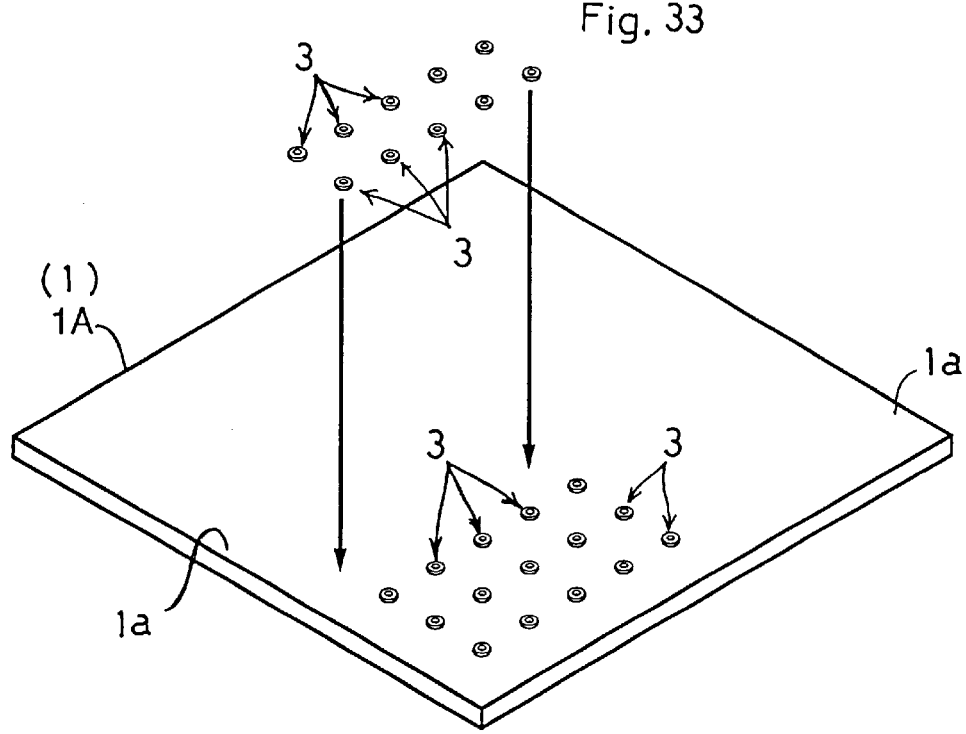
FIGS. 33 through 35 are descriptive views illustrating a manufacturing process of a glass panel.

[1] As shown in FIG. 33, spacers 3 are appropriately disposed on an upper side of the first glass sheet 1A which is disposed horizontally. This operation may be readily carried out manually by a worker. In this case, the individual spacers 3 should be disposed with using an appropriate ruler or disposing frame or the like so as to dispose adjacent spacers 3 in good order.

Though not shown, the disposing frame may be one defining a number of holes at positions where the spacers 3 should be disposed. And, after this disposing frame is set on the first glass sheet 1A, the spacers 3 will be dropped into the respective holes to be disposed on the glass sheet.

The spacers 3 and the first glass sheet 1A are not bonded in particular, for the following reason. Without bonding therebetween, by evacuating air from the space C in the subsequent step, the first glass sheet 1A and the second glass sheet 1B will strongly bind the individual spacers 3 therebetween, so as to retain these spacers 3 reliably.

Incidentally, when the spacers 3 are to be disposed in an automated manner, though not shown, the spacers 3 may be disposed more efficiently by using an automatic transfer device or the like. As such automatic transfer device, e.g. a conventional device operable to suck the individual spacers 3 may be employed.

Figure 34:
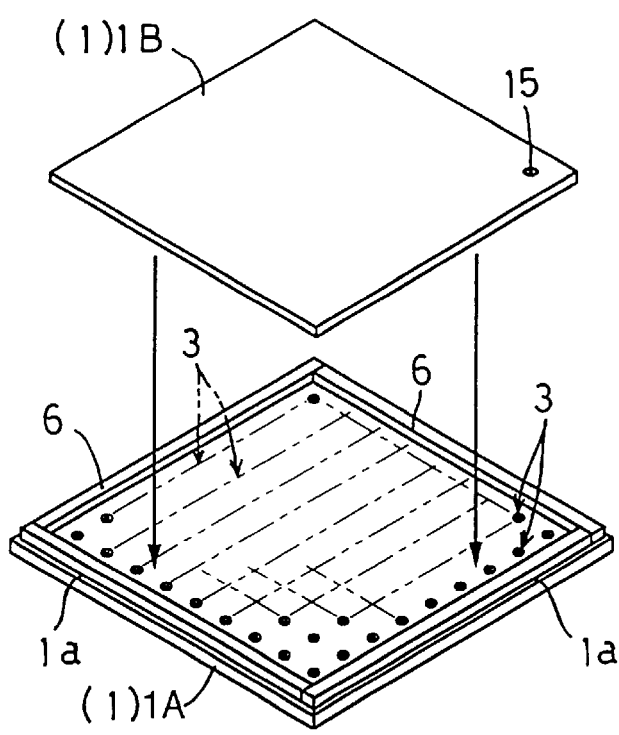

[2] As shown in FIG. 34, after the disposed conditions of the spacers 3 are confirmed, the second sheet glass 1B is superposed on the first glass sheet 1A. Then, sealing material 6 made of low-melting glass or the like is applied to the peripheral edge 1a of the first glass sheet 1A.

Incidentally, this applying operation of the sealing material 6 may be effected before the second sheet glass 1B is superposed on the first glass sheet 1A.

In the second glass sheet 1B, an evacuating hole 15 is formed in advance. This evacuating hole 15 is provided in the form of e.g. a through hole defined so as to communicate the inside and the outside of the space C with each other.

Figure 35:
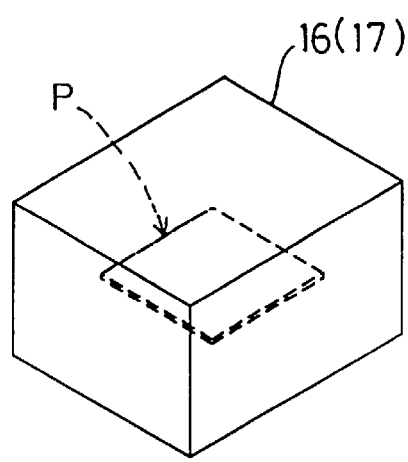

[3] Next, as shown in FIG. 35, these first and second glass sheets 1A and 1B are charged into a heating furnace 16, in which they are heated to a temperature higher than the melting point of the sealing material 6 for sealing, whereby this sealing material 6 is melted. This heating temperature is about 300 to 400° C. Thereafter, by allowing them to return to the normal temperature, the peripheral edge 1a of the space C is sealed by the sealing material 6.

[4] Further, the glass panel P is put into a pressure-reducing vessel 17 or the like, so as to evacuate air from the inside of the space C through the evacuating hole 15. In this case, the heating furnace 16 functions also as the pressure-reducing vessel 17.

After evacuating air from the space C, the evacuating hole 15 is sealed by using sealing glass material or the like. Thereafter, the glass panel P is taken out of the pressure-reducing vessel 17, whereby the finished glass panel P is obtained.

As described above, by using the spacer 3 which includes the first contact portion 5a for contacting the first glass sheet 1A and the second contact portion 5b for contacting the second glass sheet 1B and also the through portion 30 provided in the form of a hole or hole-like portion extending from the first contact portion 5a through the second contact portion 5b, a glass panel P having improved transparency has been provided.

Further, in forming the spacer 3, by causing the first contact portion 5a and the second contact portion 5b to respectively come into line or point contact with the first glass sheet 1A and the second glass sheet 1B, the heat conduction between the first glass sheet 1A and the second glass sheet 1B may be reduced, so that a glass panel P having superior heat insulating performance may be obtained.

(Alternate Embodiments in the Third Embodiment)

In the foregoing embodiment, there was described the case where the glass panel P is manufactured under the atmospheric pressure environment. Instead, all of the manufacturing steps may be effected inside the pressure-reducing vessel 17.

In this case too, the glass panel P will be manufactured in substantially similar manner to that described hereinbefore. In this case, however, there is no necessity of forming the evacuating hole 15 in the second glass sheet 1B. So that, the trouble of working the second glass sheet 1B may be relieved and the finished glass panel P may obtain further improved aesthetic appearance.

[Fourth Embodiment]

Next, a glass panel and its manufacturing method relating to this embodiment will be described with reference to the drawings.

Figure 36:
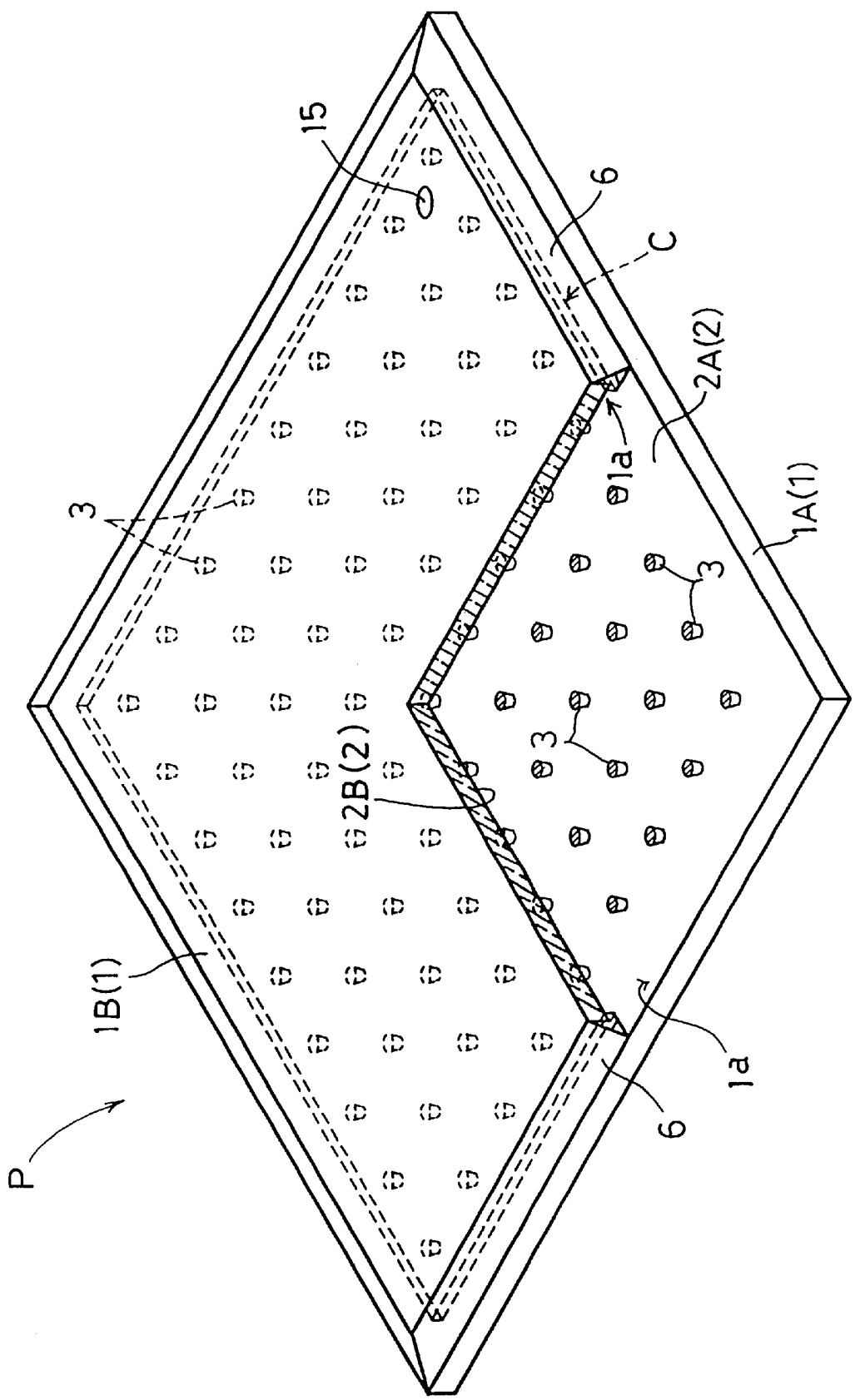
FIG. 36 is a partially cutaway perspective view showing an outer appearance of an example of a glass panel relating to a fourth embodiment.
Figure 37:
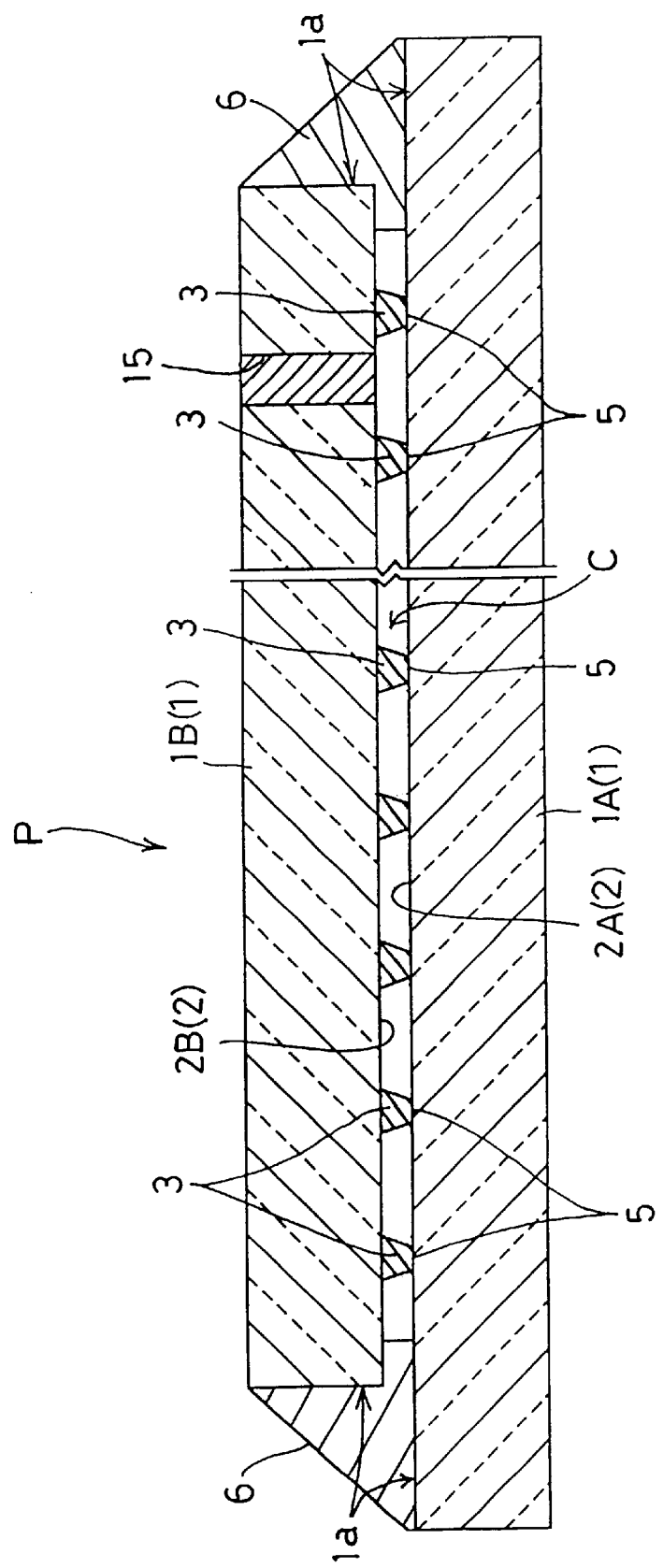
FIG. 37 is a vertical section view showing principal portions of the example of the glass panel relating to the fourth embodiment.

The plurality of spacers 3, as shown in FIGS. 36 and 37, are bonded through one side thereof with the second opposing face 2B. The spacer 3 has a truncated conical shape and has a small-diameter contact portion 5 for contacting the first opposing face 2A. This contact portion 5 is movable relative to the first opposing face 2A.

The glass panel P is assembled in the following manner.

Figure 38:
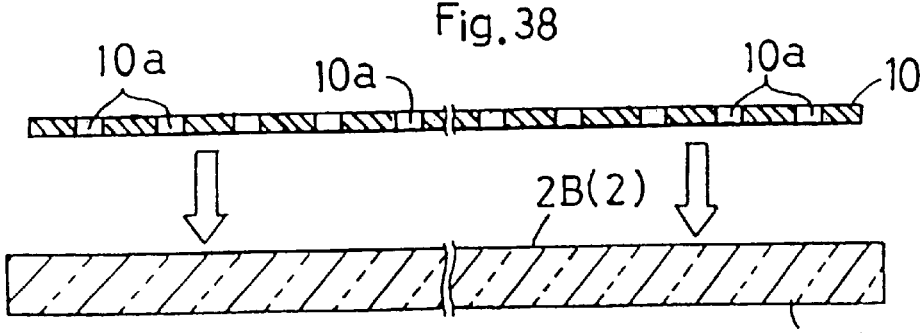
FIGS. 38 through 42 are step descriptive views illustrating an example of a manufacturing method of a glass panel.
Figure 39:
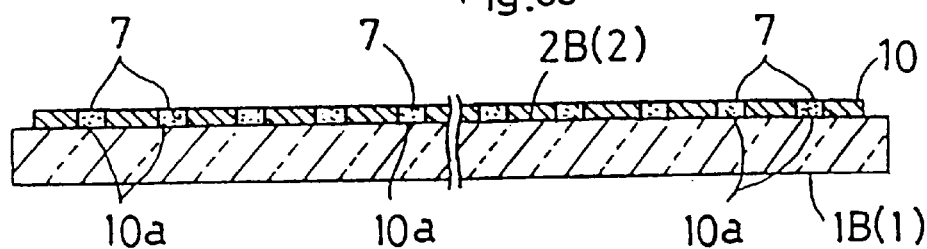
Figure 40:
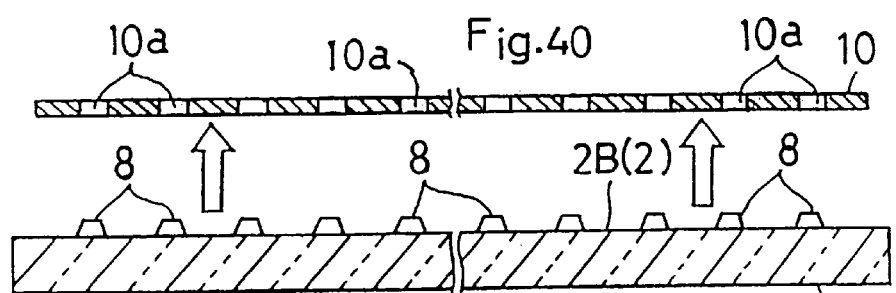

As illustrated in FIGS. 38 through 44, onto the second opposing face 2B of the second glass-sheet 1B, a, screen 10 having through holes 10a each having a progressively reduced diameter away from the second opposing face 2B is brought into contact (see FIG. 38). Into these through holes 10a, paste 7 prepared in advance is rubbed (see FIG. 39). With this, on the second opposing face 2B, there are disposed truncated conical paste-formed members 8 having a gradually reduced diameter toward the top portion thereof (see FIG. 40).

The paste 7 is formed by mixing and kneading together glass frit consisting of low-melting glass fine particles having a lower fusing temperature than the softening point of the second glass sheet 1B with a binder made of e.g. an organic agent. When the paste 7 is heated up to the fusing temperature of the low-melting glass, the organic agent will be evaporated with the rise of the temperature and at the same time the fine particles of the low-melting glass will be vitrified so as to form the pre-spacer forming members 30. If the low-melting glass is crystallizable, this glass, after cooling thereof, will be crystallized and its softening point too will be increased. The fusing temperature refers to the temperature at which the low-melting glass becomes fluidized and the fluidization generally occurs at a temperature at which its viscosity becomes lower than $10^5$ poise, which temperature is about 400 to 600° C. in the case of ordinary low-melting glass for example. Accordingly, if the paste 7 is formed by using the glass frit consisting of the above-described crystallizable glass, when the low-melting glass as the sealing material 6 is heated to the fusing temperature in the course of the subsequent step of sealing the peripheral edge 1a of the glass panel P, the pre-spacer forming members 30 will not be softened or fluidized again during the operation inside the furnace.

The screen 10 may comprise one defining, as mimeographing holes, a number of through holes 10a having a cylindrical face with a diameter of 0.2 to 2.0 mm and a thickness of 10 to 35 μm with a predetermined distance therebetween (e.g. in the form of 20 mm grating). This is affixed with its large-diameter side being placed in contact with the second opposing face 2B and the paste 7 is rubbed into the through holes 10a. Thereafter, the screen 10 is removed from the second opposing face 2B. In the course of this, as the screen is pulled up with a portion of the paste 7 adhering to the through hole 10a, the upper end of the paste 7 is reduced in diameter, so that the paste formed members 8 having a predetermined shape are formed and disposed on the second opposing face 2B.

Figure 41:
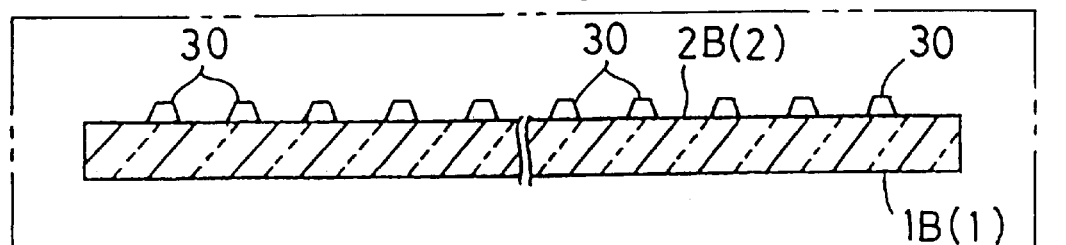
Figure 42:
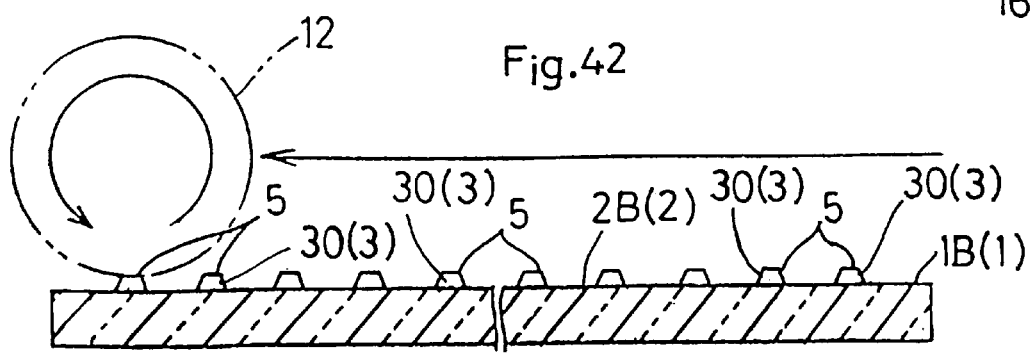

The second glass sheet 1B on which the pastes 7 are formed and disposed is charged into the heating furnace 16, so that the respective pastes are solidified to form the plurality of pre-spacer forming members 30 (see FIG. 41). Then, by traversing a shaping roll 12 thereon, the contact portions 5 of the plurality of pre-spacer forming members 30 after the solidifying operation are adjusted in height and shape to a predetermined height (e.g. precision of ±0.1 μm) relative to the second opposing face 2B respectively, so as to form the spacers 3 (see FIG. 42).

Figure 43:
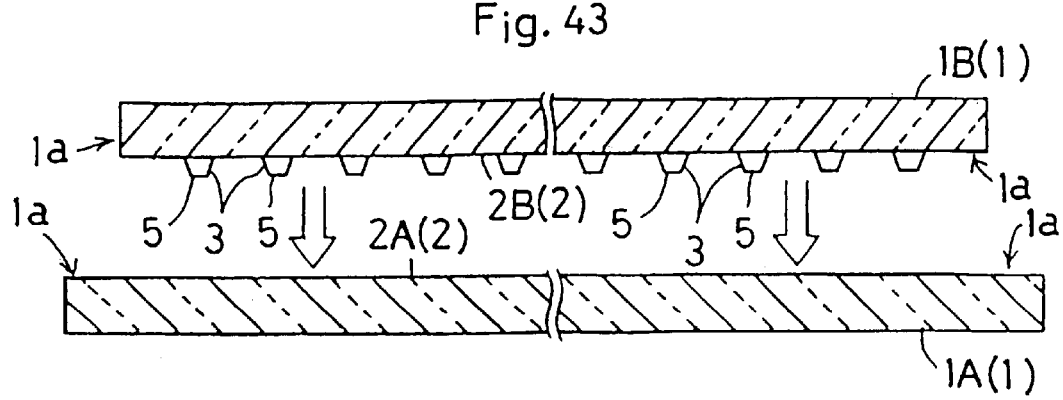
FIGS. 43 and 44 are step descriptive views illustrating steps subsequent to FIG. 42, FIGS. 45 and 46 are step descriptive views illustrating another example of a manufacturing method of a glass panel.
Figure 44:
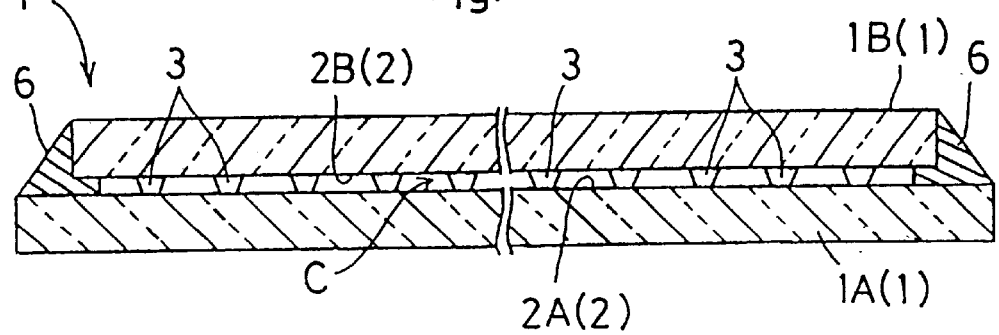

Thereafter, to the first opposing face 2A of the first glass sheet 1A, by orienting the second opposing face 2B of the second glass sheet 1B downward, the height-adjusted contact portions 5 are brought into opposition (see FIG. 43), and with the contact portions 5 being placed in contact with the first opposing face 2A, the sealing material 6 is fused along the peripheral edge 1a of the first glass sheet 1A and the second glass sheet 1B, whereby a glass panel P is formed as illustrated in FIG. 44.

The solidifying operation is conduced in accordance with the properties of the low-melting glass. For instance, the second glass sheet 1B on which the pastes 7 have been formed and disposed will be charged into the heating furnace 16 which is maintained at the baking temperature of 400 to 600° C. for example, so as to be baked therein and glass is kept inside the furnace until the plurality of formed paste-formed members 8 become vitrified to form the pre-spacer forming members 30. Thereafter, it will be taken out of the furnace and left for radiational cooling.

The height adjusting shaping operation is effected in the following manner. After the second glass sheet 1B is taken out of the furnace, during its cooling process and before the pre-spacer forming members 30 are completely solidified, the operation is conducted by pressing with a shaping roll 12, within a temperature range in which the pre-spacer forming members 30 remain deformable. Specifically, the temperature of the pre-spacer forming members 30 fused to the second glass sheet 1B taken out of the furnace is reduced from the baking temperature by 40–70° C., thereby to maintain a pre-spacer forming member softening temperature (e.g. 450° C.) at which the pre-spacer forming members 30 are deformable. To this second glass sheet 1B, the shaping roll 12 maintained at the surface temperature of 450 to 500° C. is moved along the second opposing face 2B. In the course of this, the distance from the second opposing face 2B to the roll surface is maintained at a predetermined distance (e.g. 20 μm).

This height-adjusting shaping operation is effected for the following reason. The top face of the paste-formed member 8 formed after screen printing of the paste 7 is not formed parallel with the second opposing face 2B. Then, if the solidifying operation is effected under this condition, a prominent portion may come into contact in a concentrated manner with the first glass sheet 1A, so that such damage as crack be given in the first glass sheet 1A.

According to the manufacturing process described above, in the disposing step of the paste formed members 8 for forming the spacers 3, all of the paste formed members 8 may be formed at one time by the screen printing method. And, by baking them in the furnace, a plurality of pre-spacer forming members 30 may be arranged on a plurality of glass sheets at one time, and the sealing step of the peripheral edge 1a after superposition with the first glass sheet 1A is conducted inside the pressure-reducing vessel 17. With these, a plurality of glass panels P may be formed. Hence, this process is suitable for mass production. In particular, if crystallizable glass is employed for forming the spacer 3, the softening point of the spacer 3 may be increased significantly relative to the softening point at the time of formation of the pre-spacer forming members 30. Accordingly, it is not necessary for the sealing material 6 to be made of low-melting glass having an even lower fusing temperature.

With the glass panel P manufactured by the manufacturing method of a glass panel P relating to the present invention, one side of the spacer 3 is secured to the second glass sheet 1B and the other contact portion 5 is movable relative to the first glass sheet 1A. Thus, even when the panel, as installed at a window, is flexed due to wind pressure or the like, the spacer 3 is displaced relative to the first glass sheet 1A, thereby to prevent damage of the glass panel due to the restriction resulting from the provision of the spacers 3.

Moreover, since the contact portion 5 is formed smaller in its diameter than the contact face contacting the second opposing face 2B, the heat-transfer resistance at its border portion 23 may be increased, thereby to improve the heat insulating property of the glass panel P.

[Alternative Embodiments in the Fourth Embodiment]

(1) Instead of effecting the height-adjustment shaping on the pre-spacer forming member 30, the height-adjusting shaping operation may be effected by pressing with the first glass sheet 1A in the course of the seal baking operation for baking the sealing material 6 for sealing the peripheral edge 1a. For instance, while the temperature of the first glass sheet 1A and the temperature of the second glass sheet 1B are maintained at the softening temperature of the pre-spacer forming member, the first glass sheet 1A and the second glass sheet 1B will be disposed in opposition to each other and the contact portion 5 will be brought into contact with the first opposing face 2A of the first glass sheet 1A and then pressed against the same. In this manner, the sealing material 6 will be disposed in advance at the peripheral edge 1a of the second glass sheet 1B and the first glass sheet 1A and the second glass sheet 1B will be disposed in opposition to each other inside the heating furnace 16 which is maintained at the softening temperature of the pre-space forming member, so that the height-adjusting shaping operation of the pre-spacer forming member 30 and the sealing operation of the peripheral edge 1a may be effected simultaneously.

Figure 45:
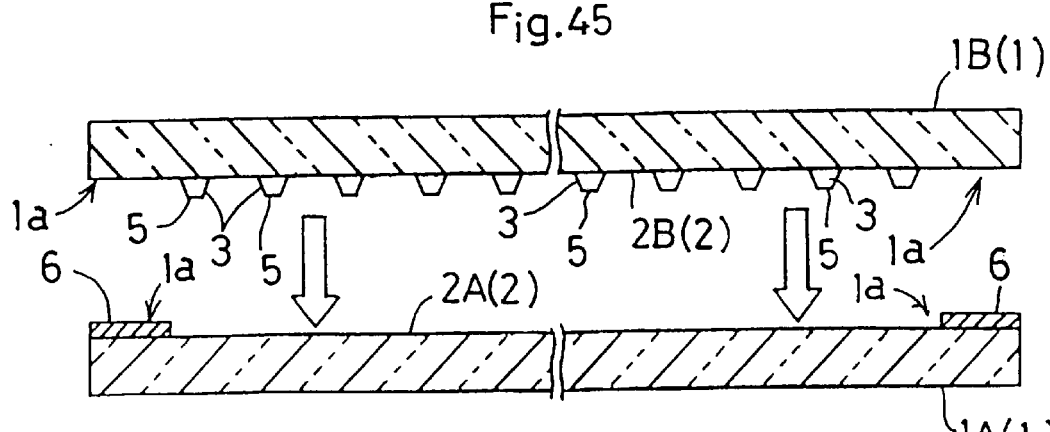
Figure 46:
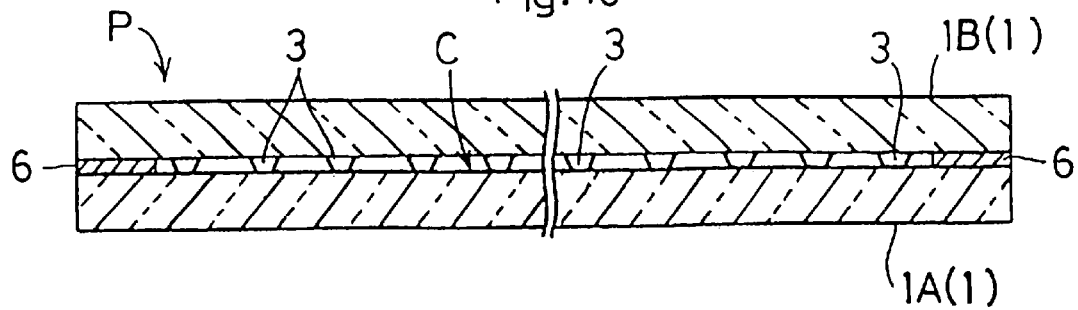
Figure 47:
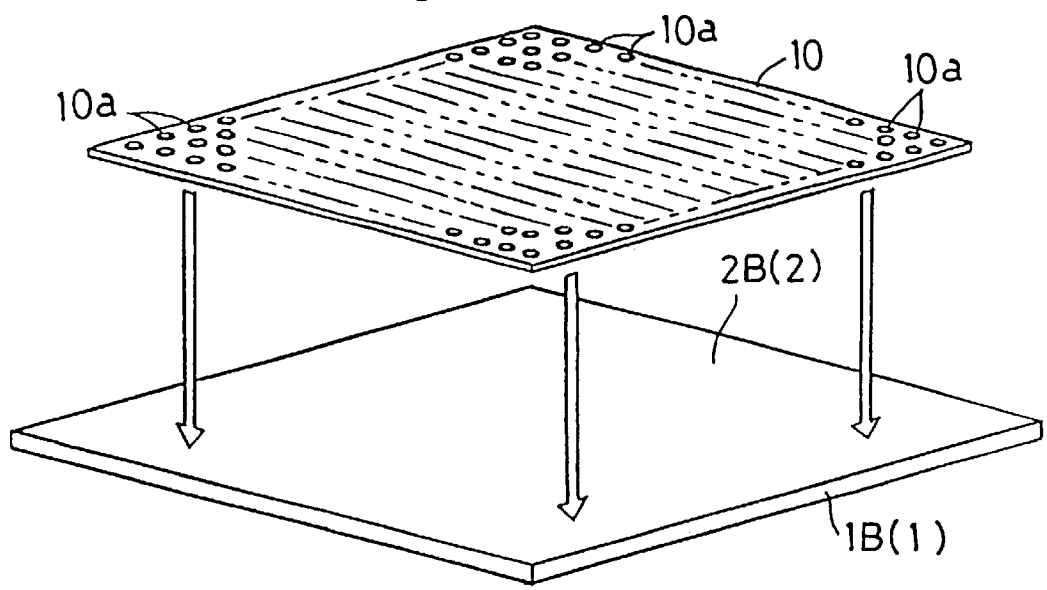
FIGS. 47 through 49 are step descriptive views illustrating another example of a manufacturing method of a glass panel.
Figure 48:
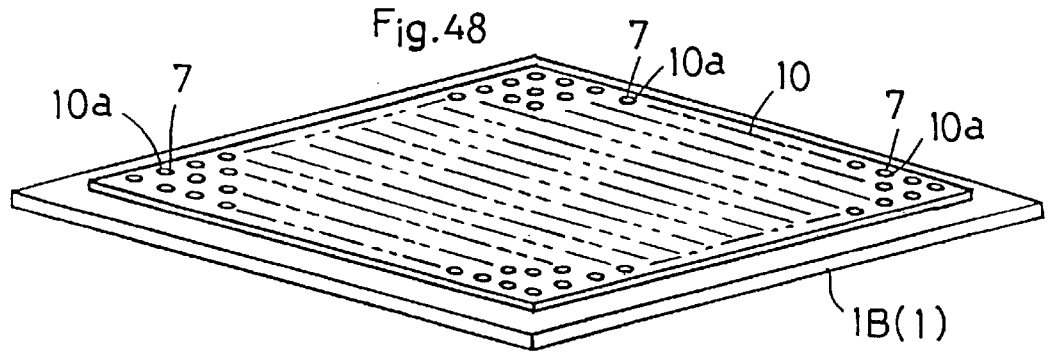
Figure 49:
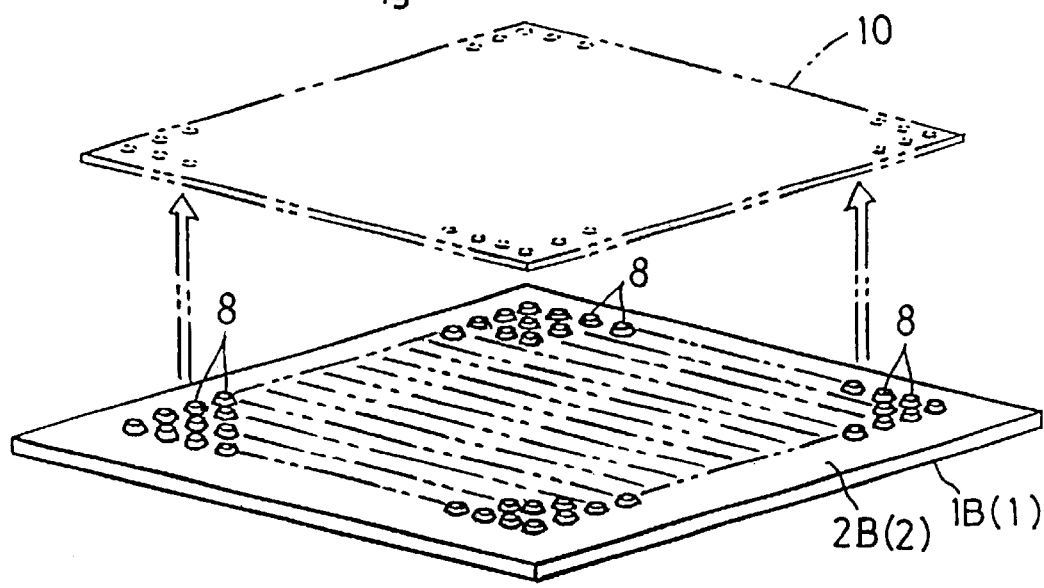

(2) Referring more specifically to the simultaneous operation of (1) above, as illustrated in FIGS. 45 and 46 for example, for sealing the peripheral edge 1a of the glass panel, if the printing technique is utilized for application of the paste 7 made of low-melting glass as the sealing material 6 for the peripheral edge 1a of the glass panel P, the operation may be effected in a labor-saving and speedy manner.

That is to say, as described in the foregoing embodiment, the screen printing method is utilized for disposing the paste 7 as well as for disposing the sealing material 6. Namely, there will be prepared the second glass sheet 1B on which the height-adjusted pre-spacer forming members 30 are fixedly disposed in advance on the second opposing face 2B thereof, and the paste 7 made of low-melting glass for forming the sealing material 6 will be printed in advance along the entire periphery of the peripheral edge 1a of the first glass sheet 1A (see FIG. 45). Then, these first and second glass sheets 1A, 1B will be integrated with each other within the pressure-reducing vessel (see FIG. 46). In this manner, the continuous and mass production of the glass panel will be facilitated.

In the above, the paste 7 for forming the sealing material 6 should be formed slightly thicker than the height of the spacer 3. This is because this paste 7 may be pressed when the first glass sheet 1A and the second glass sheet 1B are combined together and also certain amount of contraction will occur in the course of baking of the paste 7. Incidentally, although the glass frit constituting the paste 7 may be simply low-melting glass, if the crystallized glass is employed like the foregoing embodiment, the spacer 3 and the sealing material 6 may be formed of same type of glass, so that enhancement of strength may be expected. And, by effecting the sealing operation inside the pressure-reducing vessel as described above, the distance of the space C may be smaller than the convention. This is because of the following reason. Namely, in the case of the convention, in evacuating the inside of the space C through the evacuating hole 15, if the distance between the first opposing face 2A and the second opposing face 2B is small, this results in increase in the passage resistance against the evacuation, whereby the space C will not be pressure-reduced sufficiently. On the other hand, if the first glass sheet 1A and the second glass sheet 1B are superposed inside the pressure-reducing vessel 17, the first glass sheet 1A and the second glass sheet 1B are exposed to the vacuum, so that when the sealing material 6 is fused for sealing, the inside of the space C may be pressure-reduced sufficiently.

(3) In the above (2), the sealing operation inside the pressure-reducing vessel 17 may be alternatively effected in a manner described next. Namely, the paste 7 is printed on the second opposing face 2B and semi-solidified and height-adjusted pre-spacer forming members 30 are disposed at a plurality of predetermined positions on the second glass sheet 1B. Then, this second glass sheet 1B will be placed into opposition to the first glass sheet 1A on whose first opposing face 2A the sealing paste 7 is printed in advance at the peripheral edge 1a thereof with a height greater than that of the paste formed member 8, with the first opposing face 2A and the second opposing face 2B being maintained with a distance greater than the space C.

Under this condition, they will be kept inside the pressure-reducing vessel 17 which is maintained at the baking temperature of 400 to 600° C. for example, so as to effect the solidifying operation of the pre-spacer forming members 30, defoaming operation of the paste 7 and the fusing operation of the glass frit. Then, this assembly will be subjected to radiational cooling with the sealing material 6 being kept in contact with the second opposing face 2B and the first glass sheet 1A and the second glass sheet 1B being pressed together, so that the assembly is integrated to form a glass panel P.

In the above, since the applying thickness of the sealing paste 7 is set to be greater than the height of the paste-formed member 8, the sealing operation may be effected without the end of the other side of the paste-formed member 8 being contacted and pressed against the first glass sheet 1A. Accordingly, it is possible to prevent the contact portion 5 from exerting excessive contact pressure to the first opposing face 2A of the first glass sheet 1A.

According to the manufacturing process described above, the space C of the glass panel P is maintained under the degree of vacuum which is provided at the time of baking the paste 7 inside the heating furnace 16. With cooling after the sealing, the inside of the space C will be further pressure-reduced.

Also, as the baking operation of the spacer 3 and the sealing operation using the sealing material 6 are effected simultaneously, the operational efficiency may be improved and also a plurality of glass panels P may be treated at one time within the furnace.

Incidentally, since the defoaming may be promoted by increasing the heating temperature at the time of the defoaming step 20 to 30° C. higher than the baking temperature, the time required for the defoaming step may be reduced. Therefore, with provision of the vacuum heating treating system, the operational costs may be significantly reduced.

(4) In the foregoing embodiment, the spacer 3 is formed by solidifying the pre-spacer forming member 30. Instead, each paste 7 may be subjected to a semi-solidifying step to form a pre-spacer forming member 30 under semi-solidified condition. Then, the contact portion 5 of this semi-solidified pre-spacer forming member 30 for contacting the first glass sheet 1A will be subjected to the height-adjusting shaping step and then, this each height-adjusted pre-spacer forming member 30 will be subjected to a solidifying step, whereby a plurality of spacers 3 may be formed.

Figure 50:
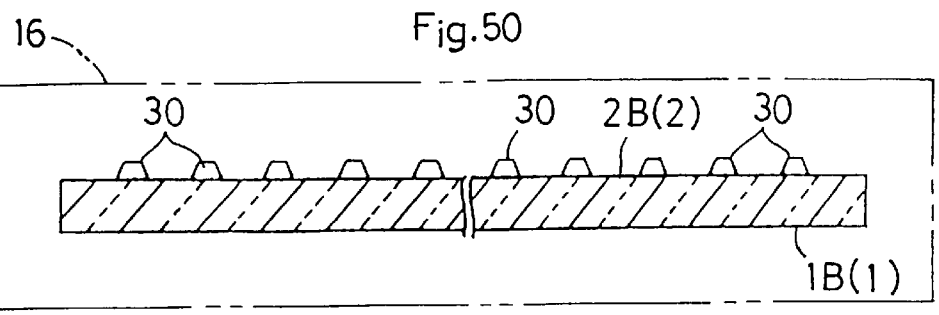
FIGS. 50 through 52 are step descriptive views illustrating steps subsequent to FIG. 49, FIGS. 53 and 54 assembly process descriptive views illustrating another example of a manufacturing method of a glass panel.
Figure 51:
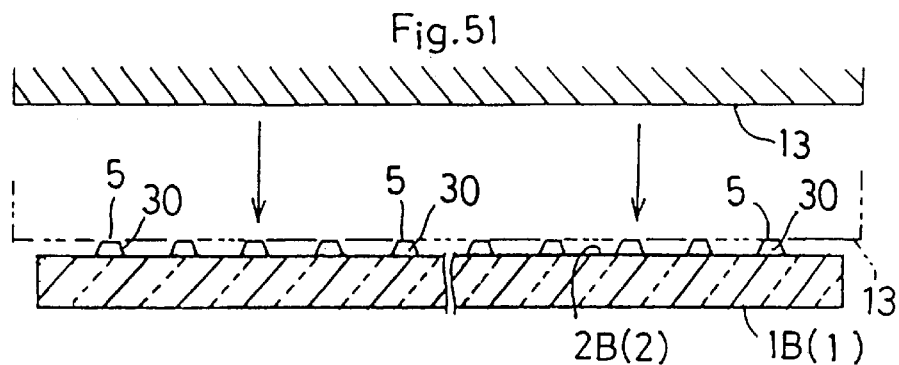
Figure 52:
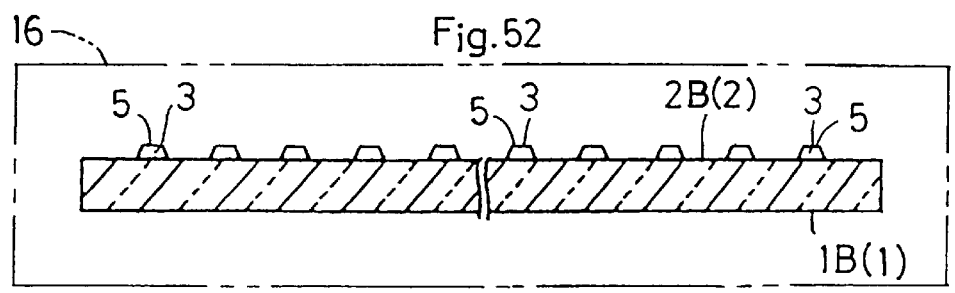

For instance, as shown in FIGS. 47 through 52, the screen 10 will be affixed to the second glass sheet 1B (see FIG. 47), the paste 7 will be charged into the through holes 10a of the screen 10 (see FIG. 48), the paste-formed members 8 will be formed and disposed in a predetermined shape on the second glass sheet 2B of the second glass sheet 1B (see FIG. 49), this second glass sheet 1B will be charged into the heating furnace 16 whose in-furnace temperature is maintained under the baking temperature (e.g. 400 to 600° C.) of the paste 7 and then taken out of the furnace in a non-solidifying temperature range (e.g. 400 to 450° C.), whereby each paste 7 will be semi-solidified to form the semi-solidified pre-spacer forming member 30 (see FIG. 50). Then, the contact portion 5 capable of contacting the first glass sheet 1A of this semi-solidified pre-spacer forming member 30 is pressed flat by means of e.g. a press 13, so as to be height-adjusted to a predetermined height relative to the second opposing face 2B of the second glass sheet 1B (see FIG. 51), and this second glass sheet 1B is cooled to the room temperature so as to subject each height-adjusted pre-spacer forming member 30 to a predetermined solidifying operation,, whereby a plurality of spacers 3 may be formed (see FIG. 52).

Thereafter, in the same manner as illustrated hereinbefore in FIGS. 43 and 44, the first opposing face 2A of the first glass sheet 1A will be placed in opposition to the height-adjusted contact portions 5, whereby the glass panel P is formed.

(5) The screen 10 may comprise any screen such as metal screen, conventional silk screen, plastic screen and so on.

(6) Further, the printing method employed for forming the paste-formed members 8 by means of printing may comprise any printing method such as surface printing, copperplate printing, lithography, and so on.

Also, a photosensitive film may be formed on the first opposing face 2A and the second opposing face 2B. Then, beam is irradiated onto positions where the spacers 3 are to be disposed, and after removing the beam-exposed portion, the paste 7 will be applied and then baked. The remaining films may be removed in the course of this baking operation of the paste 7. In addition to the above, a printing method utilizing a functional membrane may be employed.

(7) In the foregoing, the paste-formed member 8 is formed by means of screen printing. Instead, the paste-formed member 8 may be formed by discharging the paste 7, by means of a dispenser or the like, onto the peripheral edge 1a of the glass sheet 1. By adjusting the discharging rate and also the rate of moving the discharge nozzle away, the member may be readily formed in the shape which has a gradually reduced vertical diameter from the bottom to the top thereof.

(8) In the foregoing embodiment, the spacer 3 is formed in the truncated conical shape of truncated cone. Here the term "truncated conical" is understood to denote not only a truncated cone per se, but also such a shape shown in FIG. 37 for instance in which a side face of a truncated cone is outwardly bulged along the entire periphery thereof, or is receded along the entire periphery thereof. The former shape may be readily formed in case the spacers 7 are formed by means of the dispenser.

Further, the shape of the spacer 3 is not limited to the truncated conical shape, but may be a shape whose horizontal section is a deformed oval, elliptical or circular shape. Also, it may be a polygonal shape consisting of squares, rectangles, triangles, or the like. In these cases too, the representative diameters of their horizontal sections will be referred to as "diameters". In short, what is essential is that the spacer 3 have a gradually reduced diameter from its contact portion bonded to the second glass sheet 1B towards its top.

Incidentally, the degree of reduction in the diameter may be such that it is enlarged in the vicinity of the top and the diameter of the contact portion 5 is smaller. All of these shapes can achieve the same effects as the shape described in the foregoing embodiment.

Figure 53:
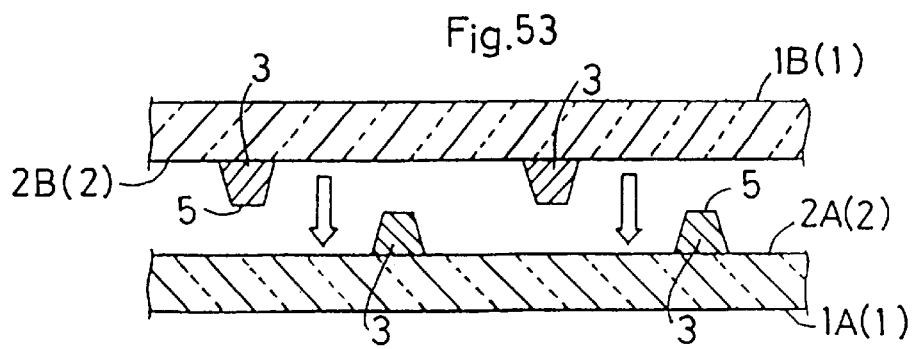
Figure 54:
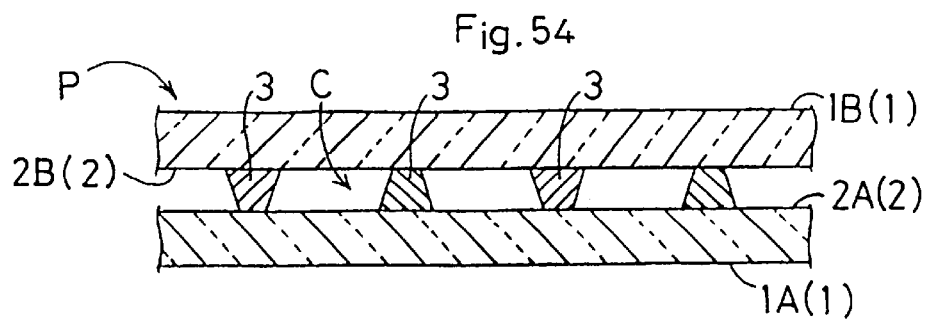
Figure 55:
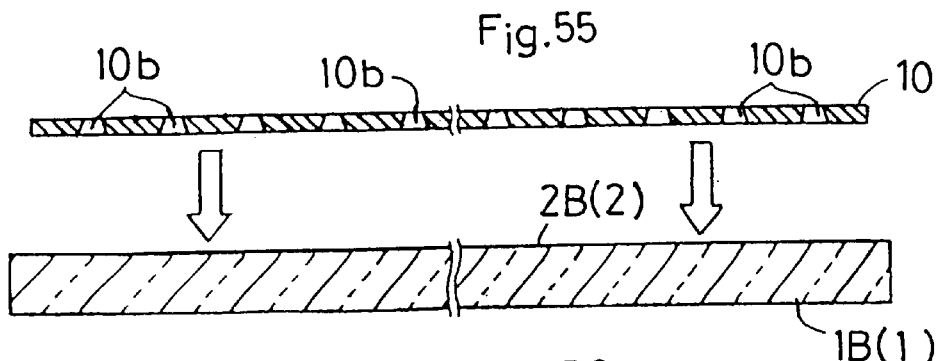
FIGS. 55 through 59 are step descriptive views illustrating another example of a manufacturing method of a glass panel.
Figure 56:
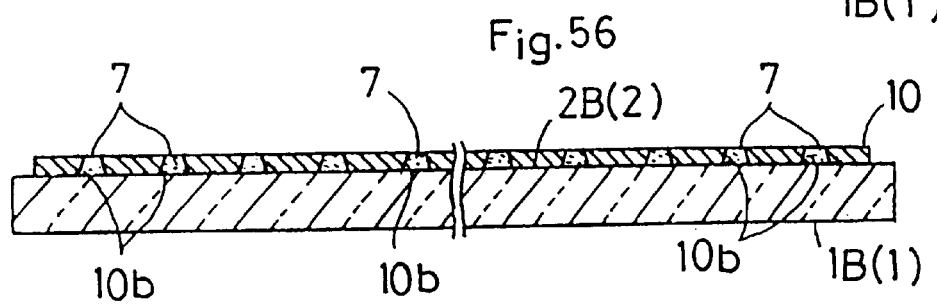
Figure 57:
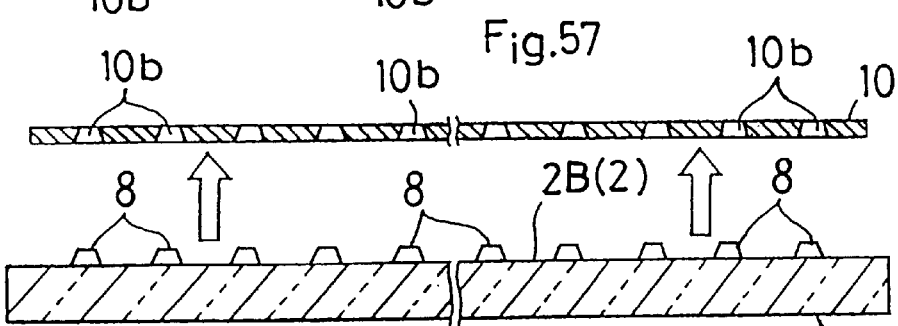
Figure 58:
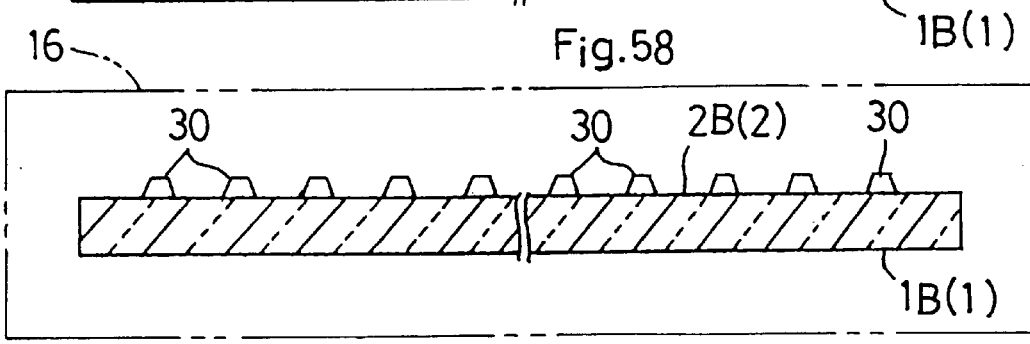
Figure 59:
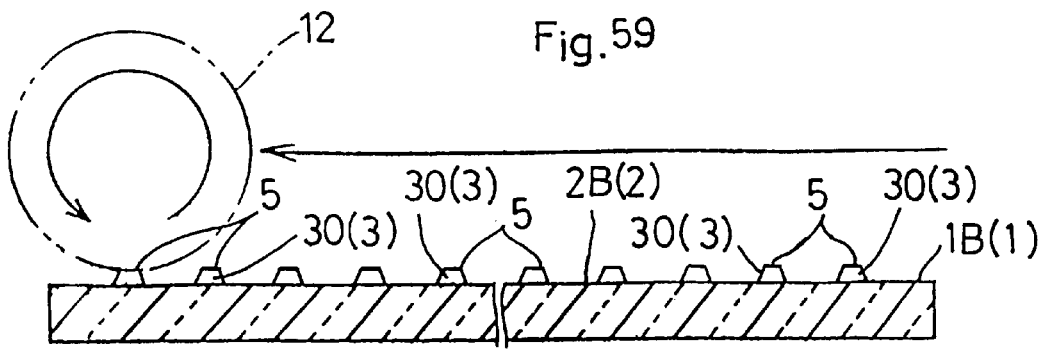
Figure 60:
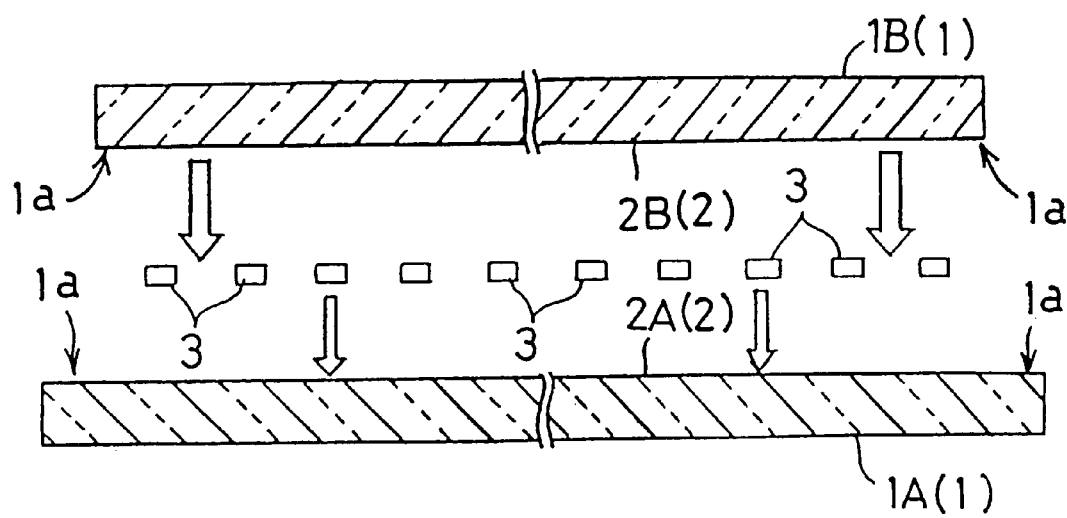
FIGS. 60 and 61 are descriptive views in vertical section illustrating an example of a conventional glass panel.
Figure 61:
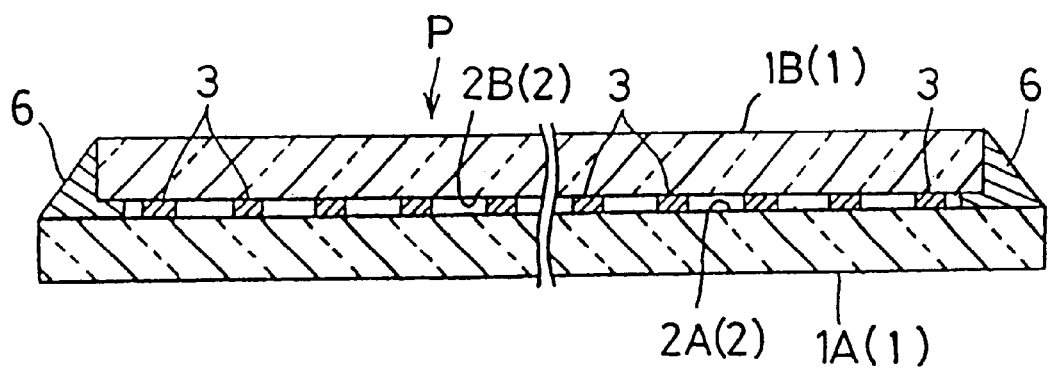

(9) In the foregoing, the paste-formed members 8 are disposed only on the second glass sheet 1B. Instead, as shown in FIGS. 53 and 54, the spacers 3 may be formed also such that the paste-formed members 8 are disposed on the first opposing face 2A and the second opposing face 2B, respectively.

In this case, the spacers 3 are formed such that the paste-formed members 8 are disposed at the positions of the first opposing face 2A and the second opposing face 2B offset from each other and the contact portions 5 of these spacers 3 are placed into contact with the respective opposing faces 2A, 2B.

(10) In the foregoing embodiment, there is employed the screen 10 having a thickness of 10 to 35 μm and defining, as the mimeographing holes, the holes 10a having a cylindrical face with a diameter of 0.2 to 2.0 mm with a predetermined pitch (e.g. in the form of 20 mm grating). Instead, as shown in FIGS. 55 through 59, the screen 10 may define, as the mimeograph holes, through holes 10b having a tapered face with a large diameter of 0.2 to 2.0 mm and a small diameter of 0.1 to 1.0 mm.

Then, the large-diameter sides of the through holes 10b are affixed to the second opposing face 2B of the second glass sheet 1B and the paste 7 is rubbed into the through holes 10b from the small-diameter sides of the through holes 10b, and then the screen 10 is removed from the second opposing face 2B. With these, as the through hole 10b is formed of a tapered face, this provides a draft, so that the rubbed-in paste 7 will remain adhered to the screen 10 without being removed from the second opposing face 2B of the second glass sheet 1B and also the formed paste-formed members 8 will not be deformed, hence, the paste-formed members 8 may be formed and disposed with the predetermined shape on the second opposing face 2B.

(11) The spacer 3 is not limited to the spacer described in the foregoing embodiment made of low-melting glass. Instead, it may be formed of e.g. stainless steel, nickel alloy containing nickel-based supper alloy such as Inconel 718 or the like, or other metal, silica glass, ceramics and so on. In short, it should be made of any material which is hardly deformed when subjected to an external force to prevent contact between the first glass sheet 1A and the second glass sheet 1B.

[Other Alternative Embodiments]

Incidentally, the glass panels P relating to the first through fourth embodiments described above may be constructed alternatively as described next.

(1) The glass sheet is not limited to the glass sheet having 3 mm thickness described in the foregoing embodiments, but may be of a glass sheet having a different thickness. Also, the type of glass may be selected as desired. For instance, it may be figured glass, frosted glass (glass provided through a surface treatment thereof with the function of diffusing light), wire glass or tempered glass, plate glass provided with the function of heat absorption, ultraviolet absorption, heat reflection or the like, or any combinations of these.

(2) Further, as for the composition of the glass, it may be sodium silicate glass (soda lime silica glass), boric silicate glass, or various kinds of crystallized glass.

(3) The glass sheets 1 are not limited to those in which the first glass sheet 1A and the second glass sheet 1B have different lengths or dimensions. Instead, the glass sheets may be of same dimensions. And, the superposing manner of the first glass sheet 1A and the second glass sheet 1B may alternatively be such that the peripheral edges thereof are superposed in alignment with each other.

Further, the glass panel P may comprise an assembly of first and second glass sheets 1A, 1B having different thickness from each other.

INDUSTRIAL APPLICABILITY

The glass panel, glass panel manufacturing method and a spacer for use in the glass panel relating to the present invention may be used for a variety of applications. For example, they may be used for buildings, vehicles (windowpane of automobile, windowpane of railway cars, windowpane of ship), instrument components (surface glass of a plasma display, door or wall of a refrigerator, door or wall of a heat reserving device).

What is claimed is:

1. A glass panel in which a plurality of spacers are formed between and along a first opposing face of a first glass sheet and a second opposing face of a second glass sheet so as to form a space therebetween, and a sealing material which is capable of maintaining the space gas-tight at peripheral edge of the first glass sheet and the second glass sheet and capable also of integrating the first glass sheet and the second sheet glass together is provided at the peripheral edge;

wherein said plurality of spacers are disposed along the second opposing face, said each spacer including, only in one side thereof, a plurality of projections which projections are formed to have a predetermined height from the other side so that these form a contact portion capable of coming into contact with the first opposing face; and said contact portion is movable relative to the first opposing face.

2. A glass panel according to claim 1, wherein said projections are formed by means of cutting.

3. A glass panel according to claim 1 wherein the other side of the spacer is fixedly formed on the second opposing face.

4. A glass panel according to claim 3, wherein the other side of the spacer is bonded to the second opposing face.

5. A glass panel according to claim 1, wherein the spacer is made of low melting glass.

6. A glass panel according to claim 5, wherein the spacer is made of crystalline glass.

7. A glass panel according to claim 5, wherein the sealing material comprising a low-melting glass having a lower softening point than the low melting glass forming the spacer.

8. A glass panel in which a plurality of spacers are interposed between a first opposing face of a first glass sheet and a second opposing face of a second glass sheet so as to form a space between the first glass sheet and the second glass sheet and a sealing material is disposed at peripheral edges of the first and second opposing faces, the sealing material being capable of maintaining the space gas-tight at the peripheral edges of the first and second glass sheets and capable also of integrating the first and second glass sheets together;

wherein one side of each of the plurality of spacers is bonded to the second opposing face and the other side of each spacer has a smaller diameter than the one side and a predetermined constant height from the other side so as to provide a contact portion capable of coming into contact with the first opposing face and said contact portion is movable relative to the first opposing face.

9. A glass panel according to claim 8, wherein the spacer has a truncated conical shape.

10. A method of manufacturing a glass panel comprising the steps of:

disposing a plurality of spacers between a first opposing face of a first glass sheet and a second opposing face of a second glass sheet to form a space between the first glass sheet and the second glass sheet; and sealing and integrating peripheral edge of the first glass sheet and the second glass sheet;

wherein the method comprises the steps of:

preparing a paste capable of forming each spacer;

forming the paste into a predetermined shape having a gradually reduced diameter toward its top and disposing it on the second opposing face;

then subjecting each paste to a predetermined solidifying operation to provide a plurality of pre-spacer forming members;

adjusting a contact portion capable of contacting the first glass sheet of each of the plurality of pre-spacer forming members after the solidifying operation thereof into a predetermined height relative to the second opposing face so as to provide the spacers; and integrating the first glass sheet and the second glass sheet together with placing the first opposing face in opposition to the height-adjusted contact portion.

11. A method of manufacturing a glass panel comprising the steps of:

disposing a plurality of spacers between a first opposing face of a first glass sheet and a second opposing face of a second glass sheet to form a space between the first glass sheet and the second glass sheet; and sealing and integrating peripheral edges of the first glass sheet and the second glass sheet;

wherein the method comprises the steps of:

preparing a paste capable of forming each spacer;

forming the paste into a predetermined shape having a gradually reduced diameter toward its top and disposing it on the second opposing face;

subjecting each paste to a predetermined semi-solidifying operation to provide a plurality of semi-solidified pre-spacer forming members;

adjusting a contact portion capable of contacting the first glass sheet of each of the plurality of semi-solidified pre-spacer forming members after the semi-solidifying operation thereof into a predetermined height relative to the second opposing face;

subjecting the height-adjusted pre-spacer forming members to a predetermined solidifying operation so as to provide a plurality of spacers; and integrating the first glass sheet and the second glass sheet together with placing the first opposing face in opposition to the height-adjusted contact portion.

12. A method of manufacturing a glass panel according to claim 10, wherein the spacer is shaped in the form of a truncated cone.

13. A method of manufacturing a glass panel according to claim 11 wherein the spacer is shaped in the form of a truncated cone.

* * * * *